(12) United States Patent
Li

(10) Patent No.: US 12,146,607 B2
(45) Date of Patent: Nov. 19, 2024

(54) GIMBAL

(71) Applicant: Shenzhen Yuanli Chuangzhi Technology Co., LTD, Guangdong (CN)

(72) Inventor: Hailong Li, Guangdong (CN)

(73) Assignee: Shenzhen Yuanli Chuangzhi Technology Co., LTD, Shenzhen (CN)

( * ) Notice: Subject to any disclaimer, the term of this patent is extended or adjusted under 35 U.S.C. 154(b) by 0 days.

(21) Appl. No.: 18/389,843

(22) Filed: Dec. 20, 2023

(65) Prior Publication Data

US 2024/0117919 A1    Apr. 11, 2024

(30) Foreign Application Priority Data

Dec. 20, 2022 (CN) .......................... 202223428643.5
Dec. 22, 2022 (CN) .......................... 202223488131.8
Jul. 14, 2023 (CN) .......................... 202321868649.6

(51) Int. Cl.
| | |
|---|---|
| *F16M 11/12* | (2006.01) |
| *F16M 11/04* | (2006.01) |
| *F16M 11/18* | (2006.01) |
| *F16M 13/04* | (2006.01) |
| *G03B 17/56* | (2021.01) |
| *F16M 11/24* | (2006.01) |

(52) U.S. Cl.
CPC ......... *F16M 11/123* (2013.01); *F16M 11/041* (2013.01); *F16M 11/18* (2013.01); *F16M 13/04* (2013.01); *G03B 17/561* (2013.01); *F16M 11/242* (2013.01)

(58) Field of Classification Search
CPC ...... F16M 11/02; F16M 11/04; F16M 11/041; F16M 11/06; F16M 11/08; F16M 11/10; F16M 11/12; F16M 11/121; F16M 11/123; F16M 11/125; F16M 11/128; F16M 11/18; F16M 11/242; F16M 13/04; G03B 17/561; G03B 17/563; G03B 17/566
See application file for complete search history.

(56) References Cited

FOREIGN PATENT DOCUMENTS

CN          113227636 A  *  8/2021  ........... F16M 11/041

* cited by examiner

*Primary Examiner* — Clayton E. LaBalle
*Assistant Examiner* — Fang-Chi Chang

(57) ABSTRACT

The present invention discloses a gimbal, which belongs to the technical field of auxiliary equipment for shooting. The gimbal includes a connection part, a support assembly, a motor assembly, and a fixed assembly. The support assembly is mounted on one end of the connection part, the motor assembly is mounted on the other end of the connection part. The fixed assembly can be detachably mounted on the motor assembly. In particular, the fixed assembly can be mounted on the motor assembly in a first direction and drive the shooting device to rotate in a roll direction. By detachably mounting the fixed assembly, the gimbal not only achieves rotation of the shooting device in the roll direction, but also achieves rotation of the shooting device in the horizontal direction, thereby ensuring stable shooting of the shooting device in different scenarios and meeting the needs of different shooting scenarios.

8 Claims, 25 Drawing Sheets

GIMBAL

CROSS-REFERENCE TO RELATED APPLICATIONS

The present invention claims priority to Chinese patent application No. 202321868649.6, filed on Jul. 14, 2023, entitled "Gimbal", and to Chinese patent application No. 202223428643.5, filed on Dec. 20, 2022, entitled "Gimbal". The present invention also claims priority to Chinese patent application No. 202223488131.8, filed on Dec. 22, 2022, entitled "Clamping device and gimbal". The disclosure of these Chinese patent applications is hereby incorporated by reference as part of the present invention.

TECHNICAL FIELD

The present invention relates to the field of auxiliary equipment for shooting, and more particularly to a gimbal.

BACKGROUND TECHNOLOGY

Currently, portable shooting devices such as smartphones, digital cameras, and the like are increasingly favored by people. These shooting devices can meet the user's need for shooting anytime and anywhere. In order to ensure the quality of shooting, these shooting devices are generally mounted on shooting auxiliary devices such as gimbals, handheld stabilizers, selfie sticks, and the like.

Existing single-axis gimbals generally fix the clamping device to the rotor end of the gimbal motor to clamp the smartphone for shooting. However, this single position greatly limits the shooting scene of the smartphone and cannot meet the requirements of stabilizing the smartphone at different angles under different scenes, which cannot better utilize the characteristics of the gimbal to stabilize smartphone shooting.

INVENTION CONTENT

The objective of the embodiments of the present invention is to provide a gimbal.

In an aspect of the present application, a gimbal is provided, including: a connection part;
a support assembly, the support assembly being mounted on one end of the connection part;
a motor assembly, the motor assembly being mounted on the other end of the connection part;
a fixed assembly, the fixed assembly being detachably mounted on the motor assembly and used to secure a shooting device;
wherein the fixed assembly is configured to be mounted on the motor assembly in a first direction and driving the shooting device to rotate in a roll direction; or
the fixed assembly is configured to be mounted on the motor assembly in a second direction and driving the shooting device to rotate in a horizontal direction.

Optionally, the fixed component is a clamping component used to clamp the shooting device, the clamping assembly is provided with a first installation portion and a second installation portion, and an action axis of the first installation portion is perpendicular to an action axis of the second installation portion;
the motor assembly is provided with a third installation portion that cooperates with the first installation portion and the second installation portion;
in the first direction, the clamping assembly is configured to be mounted on the motor assembly through cooperation of the first installation portion and the third installation portion; or
in the second direction, the clamping assembly is configured to be mounted on the motor assembly through cooperation of the second installation portion and the third installation portion.

Optionally, the clamping assembly includes a clamping base, a first ear clip and a second ear clip, the first ear clip and the second ear clip are respectively slidably arranged on opposite ends of the clamping base;
the first installation portion is arranged on a side of a back surface, an upper end surface or a lower end surface of the clamping base facing the motor assembly, and the second installation portion is arranged on a side of the first ear clip or the second ear clip away from the clamping base; and
the clamping base is configured to be mounted on the motor assembly through the cooperation of the first installation portion and the third installation portion, and the first ear clip or the second ear clip is configured to be mounted on the motor assembly through the cooperation of the second installation portion and the third installation portion.

Optionally, the motor assembly includes a stator end and a rotor end, the stator end is arranged on the connection part, and the rotor end is rotatably arranged on the stator end; and
wherein the third installation portion is arranged on a side of the rotor end away from the stator end.

Optionally, a connection method between the first installation portion or the second installation portion and the third installation portion includes a boot mouth connection, a snap connection, a threaded connection or a magnetic connection.

Optionally, the third installation portion includes an alignment part and a buckling part, the alignment part is mounted on the rotor end, and the buckling part is movably mounted on the rotor end;
the first installation portion includes a first alignment groove and a first buckling groove, the first alignment groove is arranged on the clamping base, and the first buckling groove is opened on a groove wall of the first alignment groove;
when the first installation portion and the third installation portion are connected to each other, the alignment part and the buckling part are both clamped in the first alignment groove, and the buckling part is extendable into or retractable from the first buckling groove;
the second installation portion includes a second alignment groove and a second buckling groove, the second alignment groove is arranged on the first ear clip, and the second buckling groove is opened on the groove wall of the second alignment groove; and
when the second installation portion and the third installation portion are connected to each other, the alignment part and the buckling part are both clamped in the second alignment groove, and the buckling part is extendable into or retractable from the second buckling groove.

Optionally, a structure of the boot mouth connection includes a male boot mouth and a female boot mouth;
the first installation portion and the second installation portion are one of the male boot mouth and the female boot mouth, and the third installation portion is the other of the male boot mouth and the female boot mouth;

the female boot mouth includes two side plates and a bottom plate, one end of each of the two side plates is connected to the bottom plate, and the other ends of the two side plates form an opening;

a fixed slideway is provided in the two side plates, and the two side plates and the bottom plate are combined to form a securing slot;

the male boot mouth is a plate that is matingly connected to the female boot mouth, and notches are provided at both ends of a side of the plate that is fixedly connected to the clamping assembly; and a side of the plate that is opposite to the clamping assembly is connected to the fixed slideway of the two side plates of the female boot mouth, and the male boot mouth and the female boot mouth are connected by the boot mouth connection.

Optionally, both the first ear clip and the second ear clip are connected to the clamping base through a pulling rod;

the clamping base is provided with a through hole for the pulling rod to pass through, and an end of the pulling rod is provided with an installation structure; and an end face of the installation structure is provided with a limiting opening, a spring is sleeved on the pulling rod, and the limiting opening limits the spring.

Optionally, the support assembly includes a rod body, one end of the rod body is hinged with one end of the connection part away from the clamping assembly to form a connection hinge portion; the rod body is a multi-section rod body;

the support assembly further includes a leg base and a support leg, and the other end of the rod body is arranged on the leg base in a penetrating way;

one end of the support leg is hinged with the leg base, and the other end of the support leg is unfolded or folded relative to the leg base;

a plurality of support legs are evenly distributed around the outer periphery of the leg base;

the leg base further includes a rotation body that is relatively rotatable around an axis of the rod body; and the rotation body is provided with a detachable control panel that is electrically connected to the motor assembly and generates control signals.

Optionally, a detection switch is arranged on one side of the rotor end away from the stator end;

the clamping base is provided with a first detection portion which comes into contact with the detection switch when the first installation portion and the third installation portion are connected to each other;

the first ear clip is provided with a second detection portion which comes into contact with the detection switch when the second installation portion and the third installation portion are connected to each other;

the gimbal further includes a fill light assembly, and the fill light assembly is detachably mounted on the clamping assembly; and the fill light assembly is provided with a snap-fit portion, and the first ear clip or the second ear clip is provided with a snap-fit groove that matches the snap-fit portion; when the fill light assembly is mounted on the clamping assembly, the snap-fit portion is limited and snapped into the snap-fit groove.

In another aspect of the present application, a gimbal is provided, including:

a connection part;

a motor assembly including a stator end and a rotor end, the stator end being fixed to one end of the connection part, and the rotor end being rotatable relative to the stator end;

an adapter arm one end of which is rotatably connected to the rotor end; a fixed assembly that is rotatably connected to the other end of the adapter arm and is used for securing a shooting device; and a support assembly that is connected to the other end of the connection part.

Optionally, the fixed component is a clamping component used to clamp the shooting device both ends of the adapter arm is rotatably connected to the rotor end and the fixed assembly with damping, and axis directions of adapter shafts are perpendicular to the rotational axis of the motor assembly.

Optionally, the clamping assembly includes a clamping base and a rotation base, one end of the rotation base being rotatably connected to the other end of the adapter arm, and the clamping base being rotatably mounted on the other end of the rotation base at a fixed point; and the clamping assembly further includes a first ear clip and a second ear clip, the first ear clip and the second ear clip being symmetrically and elastically connected to left and right sides of the clamping base, and is slidable in parallel relative to the clamping base.

Optionally, the clamping assembly further includes an elastic part opposite ends of which are respectively connected to the rotation base and the clamping base, so that the rotation base and the clamping base are relatively elastically connected.

Optionally, the rotation base includes a first rotation portion, and the clamping base includes a second rotation portion; and the first rotation portion being cooperatively connected with the second rotation portion so that the first rotation portion and the second rotation portion can rotate relative to each other by 360 degrees, allowing a shooting device fixed on the clamping assembly to switch between landscape and portrait shooting angles.

Optionally, the clamping assembly further includes a limiting member;

a connection pole is protrudingly provided on the first rotation portion, and a counterbore and a second through hole located at the bottom of the counterbore are provided on the second rotation portion, corresponding to the connection pole;

the connection pole passes through the second through hole and is located in the counterbore;

an elastic part is located in the counterbore and is sleeved on the connection pole;

the limiting member is fixed at the end of the connection pole and abuts against the elastic part; and/or, one of the first rotation portion and the second rotation portion is provided with at least two limiting projections, the other of the first rotation portion and the second rotation portion is provided with corresponding limiting grooves, and the limiting projections are cooperated with the limiting grooves; and when the clamping base rotates relative to the rotation base, the limiting projections is slidable from one limiting groove to another adjacent limiting groove.

Optionally, the support assembly includes a leg base, at least three support legs, a rotation body, and a rod body, the leg base having a connection end;

the rotation body is sleeved on the outer periphery of the leg base close to the connection end; and one end of the rod body is inserted into connection end of the leg base, and the other end of the rod body is rotatably connected to the other end of the connection part.

Optionally, the rod body includes a rod main body and a hinge portion, one end of the rod main body is fixedly connected to the connection end of the leg base, and the other end of the rod main body is fixedly connected to the hinge portion, and the hinge portion is adjustably rotatably connected to the connection part; and opposite surfaces of the hinge portion and the connection end are respectively provided with a snap-fit post and a snap-fit hole; and when the rod main body is in a retracted state, the snap-fit post and the snap-fit hole are interference-fitted.

Optionally, each support leg is rotatably connected to the leg base and evenly distributed around the outer periphery of the leg base to unfold or fold relative to the leg base; and/or, a rotation body sleeved on the outer periphery of the connection end is rotatable relative to the leg base; and/or, the support assembly further includes a control panel, the control panel is configured to be detachably set on the rotation body, and the control panel controls rotation of the motor assembly.

In yet another aspect of the present application, a gimbal is provided, includes:

a connection part;

a motor assembly including a stator end and a rotor end, the stator end being fixed to one end of the connection part, and the rotor end being rotatable relative to the stator end;

an adapter arm one end of which is rotatably connected to the rotor end;

a clamping assembly that is rotatably connected to the other end of the adapter arm and is used for clamping a shooting device; and a support assembly that is connected to the other end of the connection part;

wherein the clamping assembly is configured to be mounted on the motor assembly in a first direction and drive the shooting device to rotate in a roll direction; or, the clamping assembly is configured to be mounted on the motor assembly in a second direction and drive the shooting device to rotate in a horizontal direction.

The gimbal of the present invention is provided with a detachable clamping assembly, when it is necessary to rotate and shoot in the roll direction, the user only needs to install the clamping assembly on the motor assembly in the first direction (Specifically, in a direction perpendicular to the clamping assembly). When it is necessary to rotate and shoot in the horizontal direction, the user only needs to detach the clamping assembly mounted in the first direction from the motor assembly, then installs the clamping assembly on the motor assembly in the second direction (Specifically, in a direction parallel to the clamping assembly). Obviously, compared with the existing single fixed gimbal, this gimbal can not only realize the rotation of the shooting device in the roll direction, but also can realize the rotation of the shooting device in the horizontal direction, thereby ensuring stable shooting of the shooting device in different scenarios and meeting the needs of different shooting scenarios.

DESCRIPTION OF THE DRAWINGS

In order to more clearly explain the technical solutions of the embodiments of the present invention, a brief introduction will be made below regarding the drawings needed to be used in the embodiments. It should be understood that the following drawings only illustrate some embodiments of the present invention and thus should not regarded as a limitation of the scope. For those skilled in the art, other relevant drawings can be obtained based on these drawings without exerting creative efforts.

FIG. 21 is an exploded schematic diagram of the clamping assembly in

FIG. 20;

EXPLANATION OF REFERENCE NUMERALS

Figure 1:
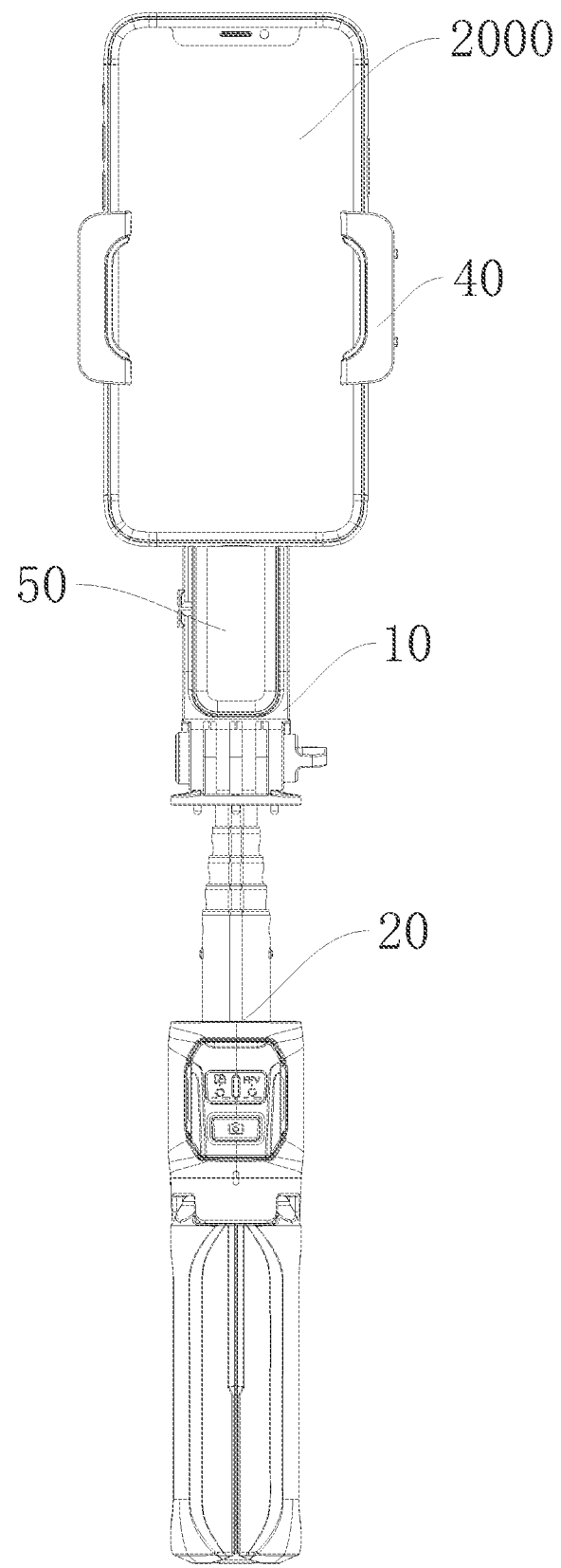
FIG. 1 is a first schematic diagram of the three-dimensional structure of a gimbal according to an embodiment of the present invention, in which the clamping assembly is mounted in a first direction.
Figure 2:
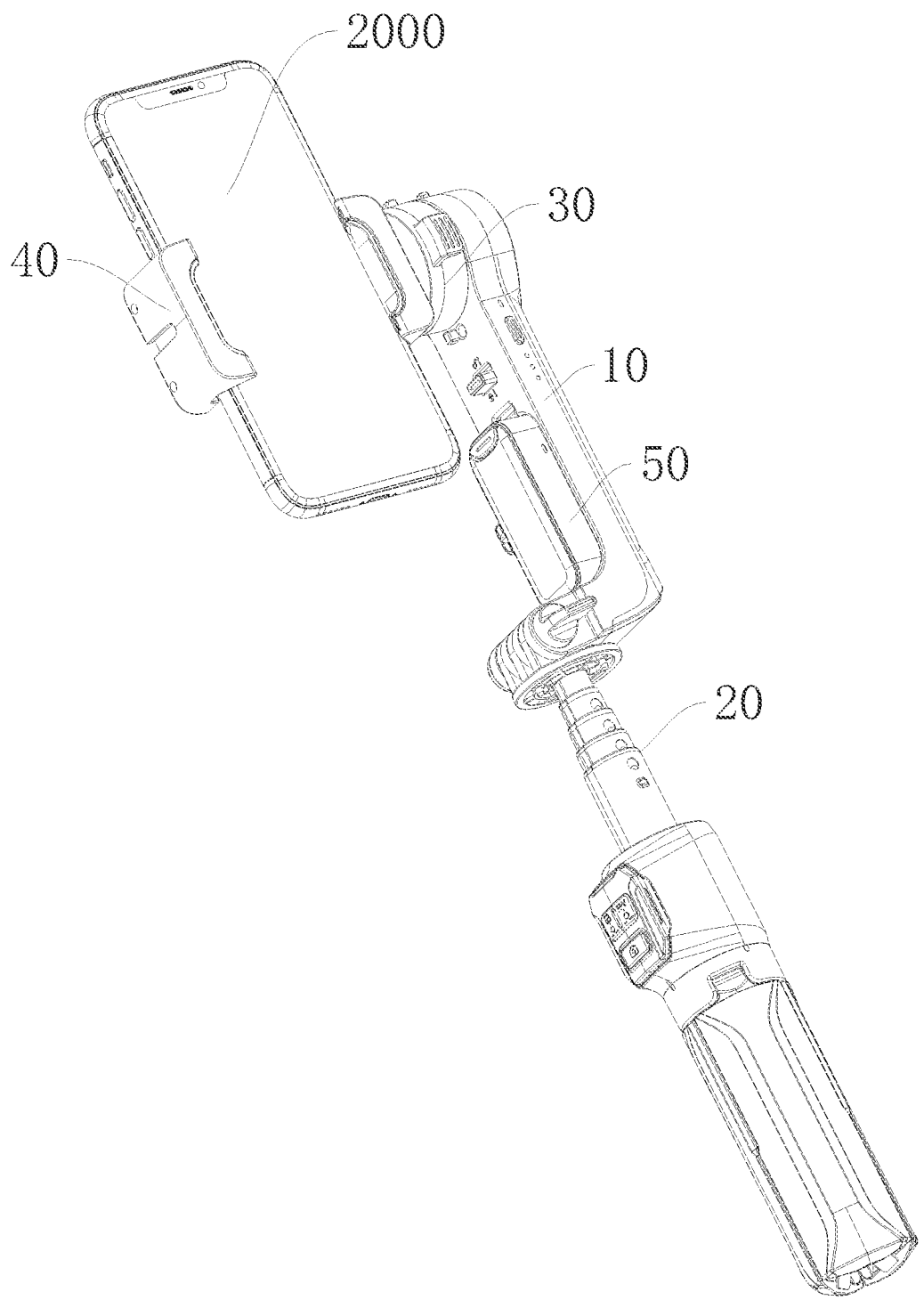
FIG. 2 is a second schematic diagram of the three-dimensional structure of the gimbal according to an embodiment of the present invention, in which the clamping assembly is mounted in a second direction.

1000. Gimbal; 2000. Shooting device;
10. Connection part;
20. Support assembly; 21. Rod body; 2101. Rod main body; 2102. Hinge portion; 22. Leg base; 21021. Snap-fit post; 24. Support leg; 25. Rotation body; 26. Control panel; 210. Leg base; 210a. Connection end; 210a1. Snap-fit hole;
30. Motor assembly; 31. Stator end; 32. Rotor end; 321. Third installation portion; 3211. Alignment part; 3212. Buckling part; 3213. Elastic element; 322. Detection switch;
40. Clamping assembly; 41. Clamping base; 411. First installation portion; 4111. First alignment groove; 4112. First buckling groove; 412. First detection portion; 401. Second rotation portion; 4011. Counterbore; 4012. Second through hole; 4001. Pulling rod; 4002. First through hole; 4003. Installation structure; 4004. Limiting opening; 4005. Spring; 4006. Plate; 4007. Notch; 42. First ear clip; 421. Second installation portion; 4211. Second alignment groove; 4212. Second buckling groove; 422. Second detection portion; 423. Clamping position; 43. Second ear clip; 431. Snap-fit groove; 432. Limiting elastic part; 44. Limiting part; 45. Self-adhesive pad; 46. Rotation base; 461. First rotation portion; 4611. Connection pole; 47. Elastic part; 4612. Limiting groove; 4013. limiting projection; 4222. Abutment end face;
1600. Male boot mouth; 2600. Female boot mouth; 2620. Side plate; 2640. Bottom plate; 2660. Opening; 2622. Fixed slideway; 2623. Clamping slot;
50. Fill light assembly; 51. Snap-fit portion;
60. Adapter arm.

DETAILED DESCRIPTION

In order to make the purpose, technical solutions and advantages of the embodiments of the present invention clearer, the technical solutions in the embodiments of the present invention will be clearly and completely described below in conjunction with the drawings in the present invention. Obviously, the described embodiments are some embodiments of the present invention, rather than all embodiments. The components of the embodiments of the present invention generally described and illustrated in the drawings herein may be arranged and designed in a variety of different configurations.

Therefore, the following detailed description of the embodiments of the present invention provided in the drawings is not intended to limit the scope of the claimed invention, but rather to represent selected embodiments of the present invention. Based on the embodiments of the present invention, all other embodiments obtained by those skilled in the art without making creative efforts fall within the scope of protection of the present invention.

It should be noted that similar reference numerals and letters represent similar items in the following figures, therefore, once an item is defined in one figure, it does not need further definition and explanation in subsequent figures.

In the description of the present invention, it should be noted that the orientation or positional relationship indicated by the terms "inner", "outer", etc. is based on the orientation or positional relationship shown in the drawings, or is the customary placement of the applied product when in use. The orientation or positional relationship is only for the convenience of describing the present invention and simplifying the description. It does not indicate or imply that the device or element referred to must have a specific orientation, be constructed and operated in a specific orientation, and therefore cannot be understood as a limitation of the present invention. In addition, the terms "first", "second", etc. are only used to differentiate descriptions and are not to be understood as indicating or implying relative importance.

In the description of the present invention, it should also be noted that, unless otherwise clearly stated and limited, the terms "arrange" and "connect" should be understood in a broad sense. For example, it can be a fixed connection or a detachable connection, or integrated connection; it can be a mechanical connection or an electrical connection; it can be a direct connection or an indirect connection through an intermediate medium; it can be an internal connection between two components. For those skilled in the art, the specific meanings of the above terms in the present invention can be understood in specific situations.

An embodiment of the present invention provides a gimbal 1000. The gimbal 1000 is used to hold and fix a shooting device 2000. The shooting device 2000 can be a mobile phone, a tablet, etc. In addition, the gimbal 1000 can be handheld for use, or can be unfolded and placed for use, or can be directly fixed and mounted at a target location.

As shown in FIGS. 1 to 6, the gimbal 1000 includes a connection part 10, a support assembly 20, a motor assembly 30 and a fixed assembly for clamping the shooting device 2000. The support assembly 20 is mounted on one end of the connection part 10 to provide stable support and balance.

In this embodiment, the support assembly 20 includes a rod body 21, a leg base 22, a hinge portion 2102 and a plurality of support legs 24. One end of the hinge portion 2102 is mounted on an end of the rod body 21 and can rotate around the axis of the rod body 21, and the other end is hinged with the connection part 10. In addition, the leg base 22 is slidably sleeved on the rod body 21. One end of each support leg 24 is hinged with the leg base 22, and the other end is unfolded or folded relative to the leg base 22, and a plurality of support legs 24 are evenly distributed around the outer periphery of the leg base 22.

Preferably, the rod body 21 is a telescopic rod. In this way, the user can not only telescopically adjust the rod body 21 as needed to suit different scenarios, but also fold or reduce the rod body 21 to a small size for easy portability and storage. Of course, in other embodiments, the rod body 21 may also be a rod member with a fixed length.

It can be understood that when the gimbal 1000 is used on a support platform, the leg base 22 slides downward in the rod body 21, and the leg base 22 drives the support legs 24 to slide downward. After sliding down a certain distance, each support leg 24 can be unfolded in the direction away from the rod body 21 and contacts the support platform, so that the gimbal 1000 can stably support the shooting device 2000.

When the gimbal 1000 is used hand-held, the leg base 22 slides upward in the rod body 21, and the leg base 22 drives the support legs 24 to slide upward, and each support leg 24 can be folded in the direction close to the rod body 21 to form a handle shape, which is convenient for the user to hold, and can reduce the space occupied by the gimbal 1000.

Of course, in other embodiments, the support assembly 20 can also be a quadripod, a base, or other structures capable of stable support. The present invention does not limit this, and those skilled in the art can choose according to the actual situation.

In addition, as shown in FIGS. 1 to 6, the motor assembly 30 is mounted on the other end of the connection part 10 for providing power and driving force. The fixed assembly is detachably mounted on the motor assembly 30.

The fixed component is a clamping component 40 used to clamp the shooting device. The fixed component provides stable support and fixation to ensure that the shooting device does not shake or detach during use. The fixed component can be a clamping component 40 or other structures such as threaded columns or snap-fit structures. For example, it can be secured by inserting it into the threaded hole of the shooting device using a threaded connection.

The clamping assembly 40 can be mounted on the motor assembly 30 in the first direction (specifically, the direction perpendicular to the clamping assembly 40), and drive the shooting device 2000 to rotate in the roll direction. Alternatively, the clamping assembly 40 can be mounted on the motor assembly 30 in the second direction (specifically, the direction parallel to the clamping assembly 40, and drive the shooting device 2000 to rotate in the horizontal direction.

It can be understood that when it is necessary to rotate and shoot in the roll direction, the user first installs the clamping assembly 40 on the motor assembly 30 in the first direction, then clamps and fixes the shooting device 2000 on the clamping assembly 40, and then controls the motor assembly 30 to work, the shooting device 2000 clamped on the clamping assembly 40 is driven to rotate in the roll direction for shooting.

When it is necessary to rotate and shoot in the horizontal direction, the user only needs to detach the clamping assembly 40 from the motor assembly 30, then installs the clamping assembly 40 on the motor assembly 30 in the second direction, and then control the motor assembly 30 to work, the shooting device 2000 clamped on the clamping assembly 40 is driven to rotate in the horizontal direction for shooting.

Obviously, compared with the existing single fixed gimbal, by detachably installing the clamping assembly 40, this gimbal 1000 can not only realize the rotation of the shooting device 2000 in the roll direction, but also can realize the rotation of the shooting device 2000 in the horizontal direction, thereby ensuring stable shooting of the shooting device 2000 in different scenarios and meeting the needs of different shooting scenarios.

In order to enable those skilled in the art to better understand the solutions of the present invention, the technical solutions in the embodiments of the present invention will be clearly and completely described below with reference to FIGS. 1 to 9.

Further, as a specific implementation in some embodiments of the present invention, as shown in FIGS. 3 to 6, the clamping assembly 40 is provided with a first installation portion 411 and a second installation portion 421. The action axis of the first installation portion 411 and the action axis of the second installation portion 421 are perpendicular to each other to ensure that the clamping assembly 40 can rotate in at least two different directions (specifically, the roll direction and the horizontal direction), so as to meet users' shooting needs in different scenes.

In addition, the motor assembly 30 is provided with a third installation portion 321 that cooperates with the first installation portion 411 and the second installation portion 421. Specifically, in this embodiment, the motor assembly 30 includes a stator end 31 and a rotor end 32. The stator end 31 is provided on the connection part 10 and the rotor end 32 is rotatably provided on the stator end 31. The third installation portion 321 is provided on the side of the rotor end 32 which is away from the stator end 31.

It can be understood that in the first direction, the clamping assembly 40 can be mounted on the motor assembly 30 through the cooperation of the first installation portion 411 and the third installation portion 321. Alternatively, in the second direction, the clamping assembly 40 can be mounted on the motor assembly 30 through the cooperation of the second installation portion 421 and the third installation portion 321.

Figure 5:
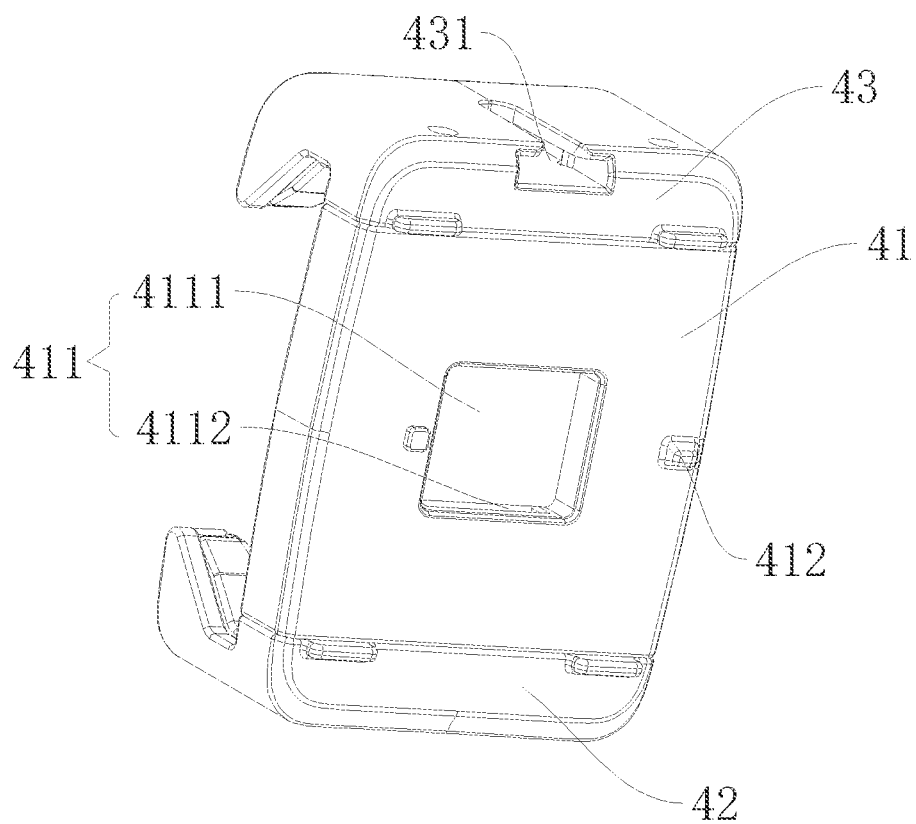
FIG. 5 is a first structural schematic diagram of the clamping assembly in FIG. 1, in which the first ear clip and the second ear clip are in a folded state.
Figure 6:
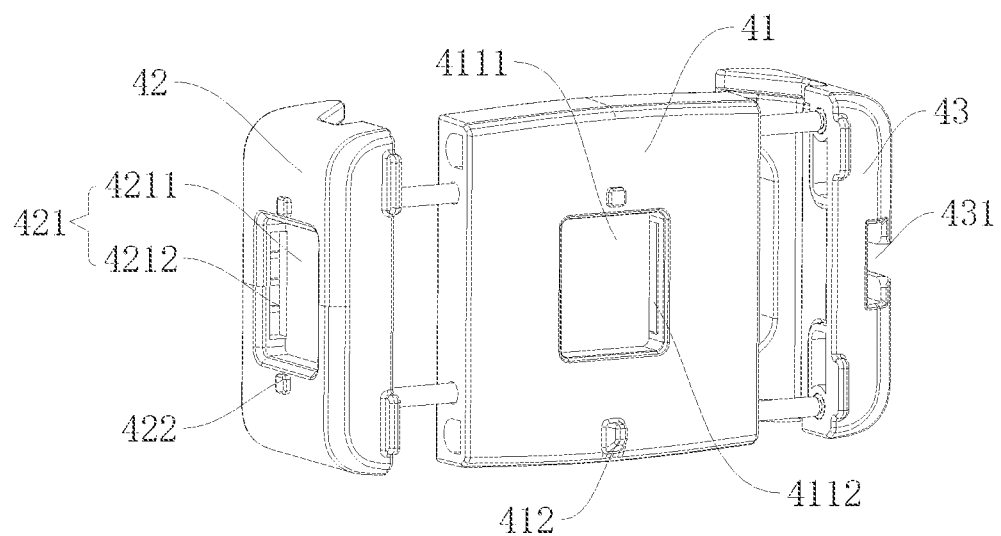
FIG. 6 is a second structural schematic diagram of the clamping assembly in FIG. 1, in which the first ear clip and the second ear clip are in an unfolded state.

Further, as a specific implementation in some embodiments of the present invention, as shown in FIGS. 5 and 6, the clamping assembly 40 includes a clamping base 41, a first ear clip 42 and a second ear clip 43. The first ear clips 42 and the second ear clips 43 are respectively slidably provided at opposite ends of the clamping base 41 for holding the shooting device 2000. Preferably, both the first ear clip 42 and the second ear clip 43 are slidable with damping relative to the clamping base 41.

The first installation portion 411 is provided on the side of the clamping base 41 facing the motor assembly 30, and the second installation portion 421 is provided on the first ear clip 42 or the second ear clip 43. The clamping base 41 can be mounted on the motor assembly 30 through the cooperation of the first installation portion 411 and the third installation portion 321, and the first ear clip 42 or the second ear clip 43 can be mounted on the motor assembly 30 through the cooperation of the second installation portion 421 and the third installation portion 321.

In this embodiment, the first installation portion 411 includes a first alignment groove 4111 and a first buckling groove 4112. The first alignment groove 4111 is provided on the clamping base 41, and the first buckling groove 4112 is opened on the groove wall of the first alignment groove 4111. In addition, the second installation portion 421 includes a second alignment groove 4211 and a second buckling groove 4212. The second alignment groove 4211 is provided on the first ear clip 42, and the second buckling groove 4212 is opened on the groove wall of the second alignment groove 4211.

It should be noted that in other embodiments, the first ear clip 42 and the second ear clip 43 can both be provided with the second installation portion 421. The present invention does not limit this, and those skilled in the art can choose according to the actual situation.

Further, as a specific implementation of the gimbal 1000 provided by the present invention, as shown in FIGS. 3 to 7, the third installation portion 321 includes an alignment part 3211 and a buckling part 3212. The alignment part 3211 is mounted on the rotor end 32, and the buckling part 3212 is movably mounted on the rotor end 32.

In detail, the third installation portion 321 also includes an elastic element 3213. One end of the elastic element 3213 is connected to the buckling part 3212, and the other end is connected to the rotor end 32 for providing elastic force to the buckling part. When the user applies force to the buckling part 3212, the buckling part 3212 can move toward the center of the rotor end 32. When the force is removed, the buckling part 3212 returns to its initial position under the elastic force of the elastic element 3213.

In addition, when the first installation portion 411 and the third installation portion 321 are connected to each other, the alignment part 3211 and the buckling part 3212 are both clamped in the first alignment groove 4111, and the buckling portion of the buckling part 3212 can extend into the first buckling groove 4112, or retract from the first buckling groove 4112. When the second installation portion 421 and the third installation portion 321 are connected to each other, the alignment part 3211 and the buckling part 3212 are both clamped in the second alignment groove 4211, and the buckling portion of the buckling part 3212 can extend into the second buckling groove 4212, or retract from the second buckling groove 4212.

It can be understood that when installing the clamping assembly 40 in the first direction, the user exerts force on the buckling part 3212, and the buckling part 3212 is forced to move toward the center of the rotor end 32. Subsequently, the user inserts the alignment part 3211 and the buckling part 3212 into the first alignment groove 4111. Then, the user stops exerting force on the buckling part 3212, and the buckling part 3212 is acted upon by the elastic force of the elastic element 3213 and returns to the initial position. At this time, the buckling portion of the buckling part 3212 extends into the first buckling groove 4112, thereby realizing the limited installation between the buckling part 3212 and the clamping base 41, that is, realizing the installation of the clamping assembly 40 in the first direction.

When installing the clamping assembly 40 in the second direction, the user exerts force on the buckling part 3212, and the buckling part 3212 is forced to move toward the center of the rotor end 32. Subsequently, the user inserts the alignment part 3211 and the buckling part 3212 into the second alignment groove 4211. Then, the user stops exerting force on the buckling part 3212, and the buckling part 3212 is acted upon by the elastic force of the elastic element 3213 and returns to the initial position. At this time, the buckling portion of the buckling part 3212 extends into the second buckling groove 4212, thereby realizing the limited installation between the buckling part 3212 and the first ear clip 42, that is, realizing the installation of the clamping assembly 40 in the second direction.

It should be noted that when the clamping assembly 40 needs to be disassembled, the user only needs to apply force on the buckling part 3212 so that the buckling portion of the buckling part 3212 is retracted from the first buckling groove 4112 (or the second buckling groove 4212) (specifically, moving towards a direction close to the center of the rotor end 32), the limited installation of the buckling part 3212 and the clamping base 41 (or the first ear clip 42) can be released, thereby detaching the clamping assembly 40 from the motor assembly 30.

Therefore, using the above technical solution, the user can quickly and easily install the clamping assembly 40 on the motor assembly 30 without damaging the clamping assembly 40 and the motor assembly 30. In addition, through the cooperation between the alignment part 3211 and the first alignment groove 4111 or the second alignment groove 4211, the installation and positioning of the clamping assembly 40 can be realized, and the clamping assembly 40 can be prevented from being offset and not mounted in place, thereby greatly improving the installation accuracy of the clamping assembly 40.

Figure 4:
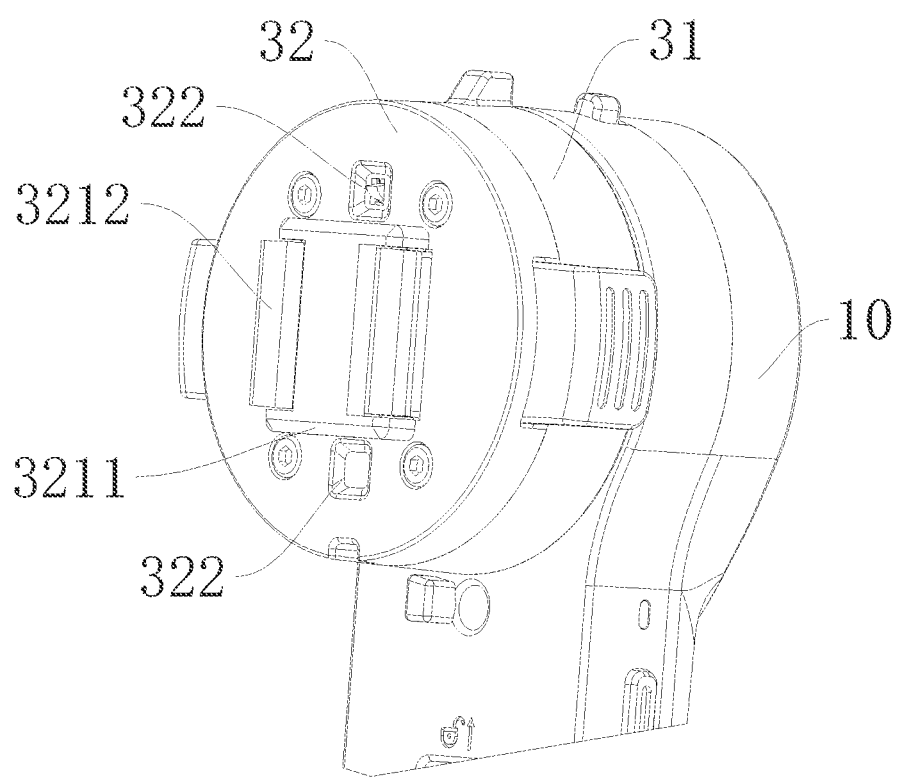
FIG. 4 is a schematic diagram of a partial structure of the motor assembly and connection part in FIG. 3.

Further, as a specific implementation of the gimbal 1000 provided by the present invention, as shown in FIGS. 4 to 6, a detection switch 322 is provided on the side of the rotor end 32 away from the stator end 31, and the clamping base 41 is provided with a first detection portion 412. When the first installation portion 411 and the third installation portion 321 are connected to each other, the detection switch 322 comes into contact with the first detection portion 412.

Specifically, when the detection switch 322 comes into contact with the first detection portion 412, the detection switch 322 will generate a first electrical signal and transmit it to the controller of the gimbal 1000. At this time, the controller of the gimbal 1000 determines that the clamping assembly 40 has been mounted on the motor assembly 30 and runs the corresponding control parameters so that the motor assembly 30 drives the shooting device 2000 to rotate in the roll direction.

In addition, the first ear clip 42 is provided with a second detection portion 422. When the second installation portion 421 and the third installation portion 321 are connected to each other, the detection switch 322 comes into contact with the second detection portion 422. Specifically, when the detection switch 322 comes into contact with the second detection portion 422, the detection switch 322 will generate a second electrical signal and transmit it to the controller of the gimbal 1000. At this time, the controller of the gimbal 1000 determines that the clamping assembly 40 has been mounted on the motor assembly 30 and runs the corresponding control parameters so that the motor assembly 30 drives the shooting device 2000 to rotate in the horizontal direction.

In this way, firstly, it can prevent the gimbal 1000 from idling without the clamping assembly 40 mounted, causing a waste of power; secondly, it can prevent the gimbal 1000 from starting to rotate when the clamping assembly 40 is not mounted at the designated position, resulting in the clamping assembly 40 slipping or swinging, which may harm the user.

Figure 3:
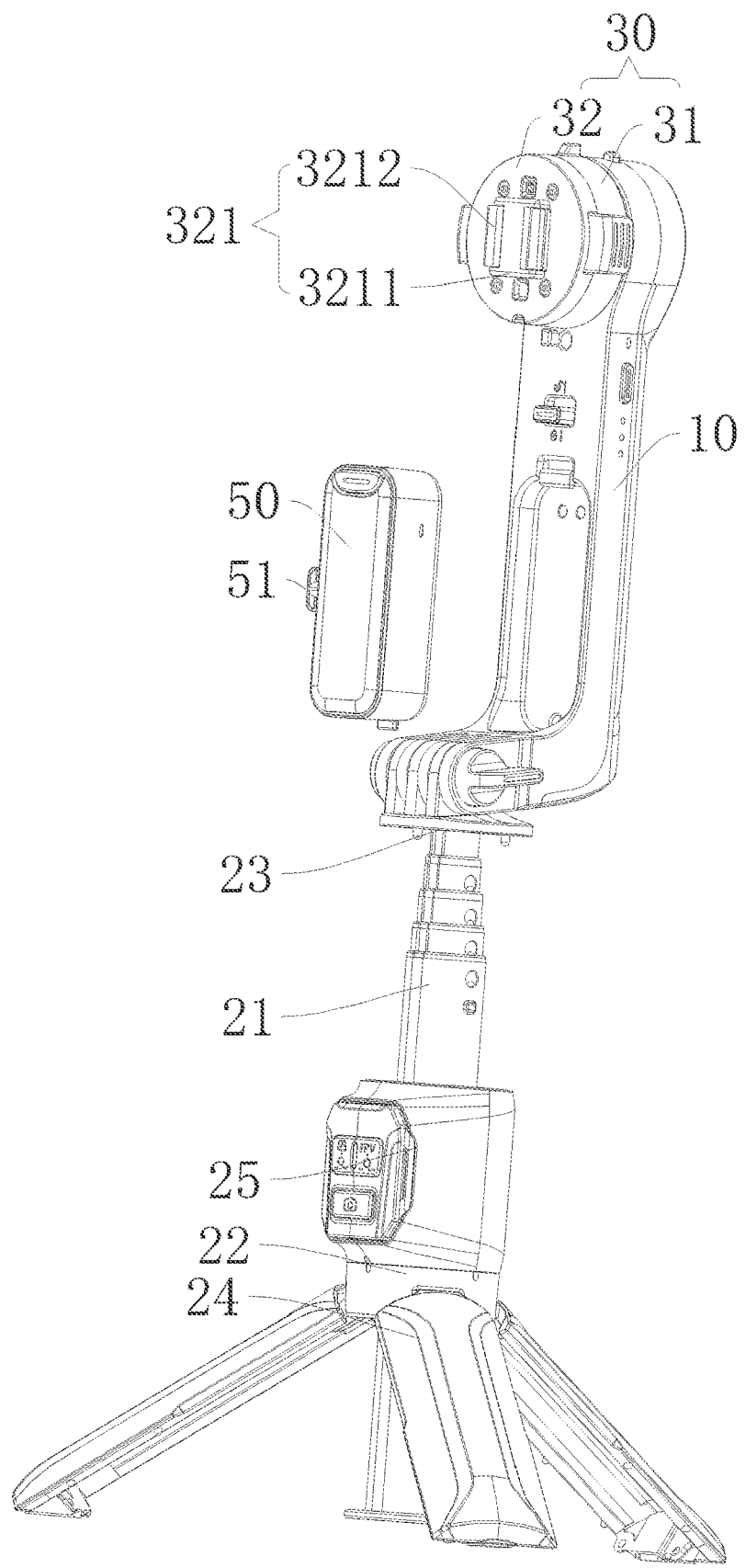
FIG. 3 is a schematic diagram of a partial structure of the gimbal in FIG. 1.
Figure 8:
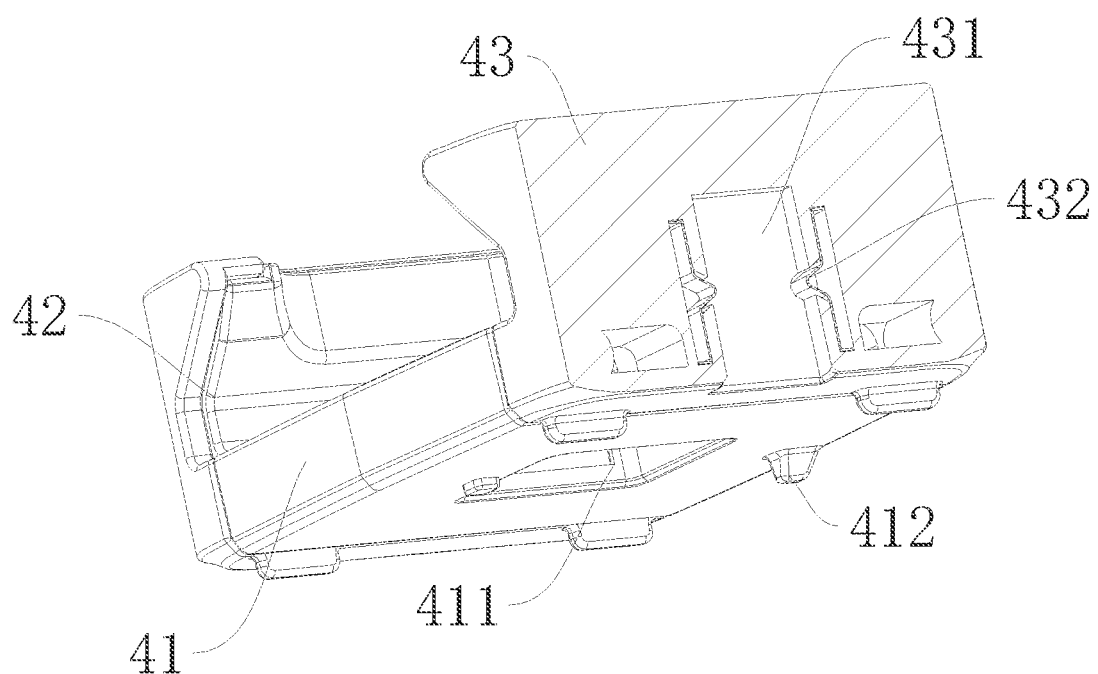
FIG. 8 is a schematic diagram of a cross-sectional structure of the clamping assembly in FIG. 5.
Figure 9:
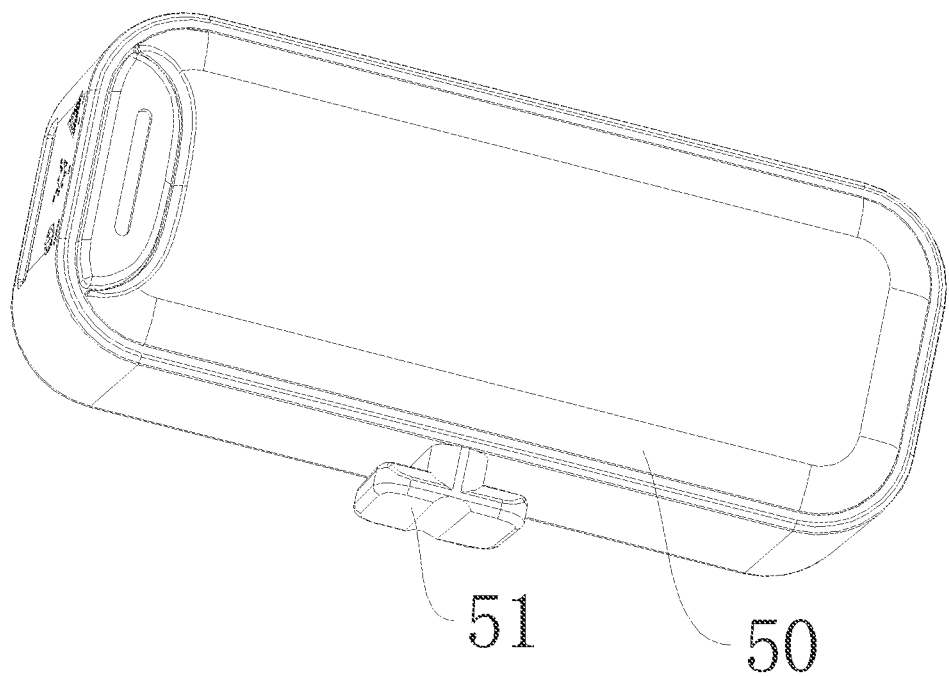
FIG. 9 is a structural schematic diagram of the fill light assembly in FIG. 3.
Figure 10:
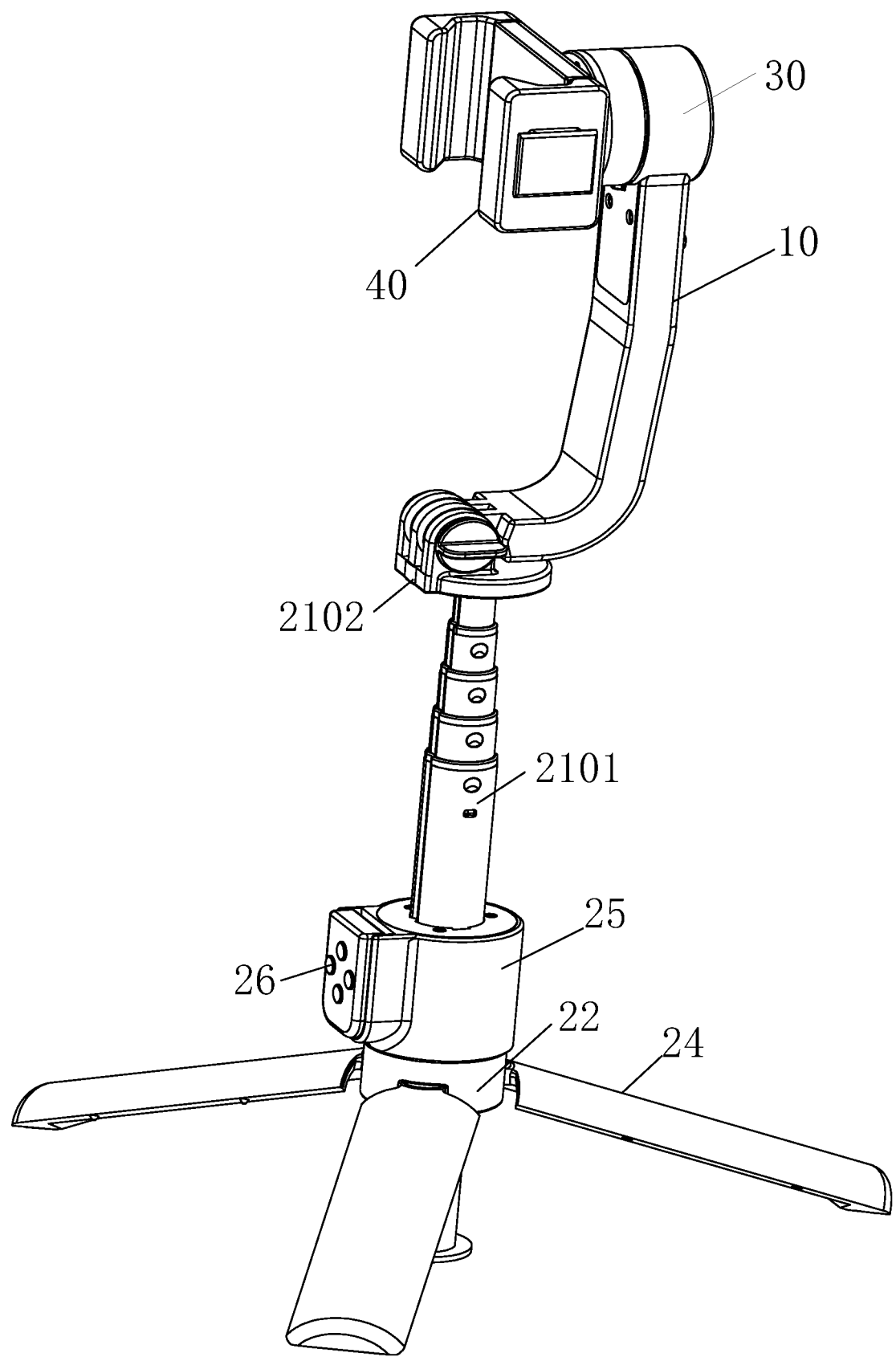
FIG. 10 is an expanded perspective view of a gimbal according to an embodiment of the present invention.
Figure 11:
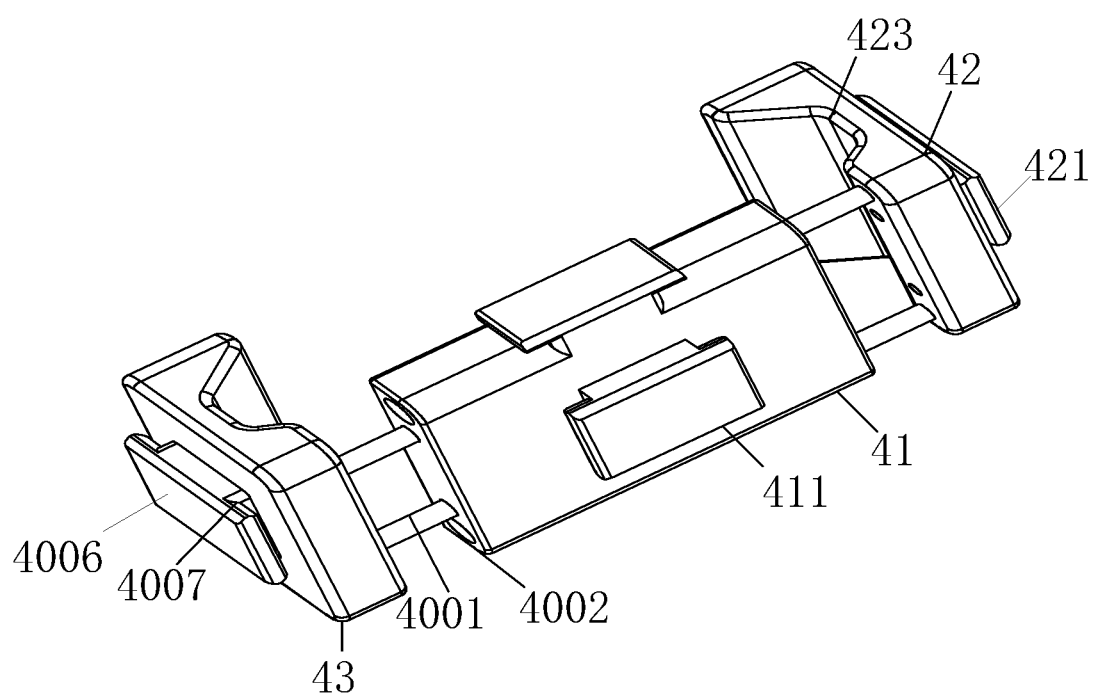
FIG. 11 is a perspective view of the clamping assembly of FIG. 10.

Further, as a specific implementation of the gimbal 1000 provided by the present invention, as shown in FIGS. 3, 8 and 9, the gimbal 1000 also includes a fill light assembly 50, and the fill light assembly 50 is detachably mounted on the clamping assembly 40. It is used to provide an additional light source to improve the brightness of the shooting environment.

In this embodiment, the fill light assembly 50 is provided with a snap-fit portion 51, and the second ear clip 43 is provided with a snap-fit groove 431 that matches the snap-fit portion 51. When the fill light assembly 50 is mounted on the clamping assembly 40, the snap-fit portion 51 is limited and snapped into the snap-fit groove 431.

In detail, the snap-fit groove 431 is a T-shaped blind hole groove. The inner surface of the snap-fit groove 431 is provided with a limiting elastic part 432, and the limiting elastic part 432 protrudes from the inner surface of the snap-fit groove 431. When the fill light assembly 50 is mounted, the snap-fit portion 51 is inserted into the snap-fit groove 431 from one side, and the side edges of the snap-fit portion 51 are pressed against the limiting elastic part 432. Due to the elastic force of the limiting elastic part 432, the fill light assembly 50 is limited and mounted on the second ear clip 43.

As shown in FIGS. 10 to 14, the present invention provides a preferred embodiment of a gimbal 1000.

A gimbal 1000 includes a clamping assembly 40 and a motor assembly 30. The clamping assembly 40 includes a clamping base 41, a first ear clip 42, a second ear clip 43, a first installation portion 411 and a second installation portion 421. The first ear clip 42 and the second ear clip 43 are provided on the clamping base 41. The first installation portion 411 is provided on at least one of the back surface of the clamping base 41, the upper end surface of the clamping base 41, and the lower end surface of the clamping base 41. The second installation portion 421 is provided on at least one of the first ear clip 42 and the second ear clip 43. It solves the problem in the prior art that the gimbal has only a single fixed position. The user can choose the desired clamping posture of the shooting device according to different shooting angles and directions.

In addition, the motor assembly 30 includes a stator end 31, a rotor end 32 and a third installation portion 321. The stator end 31 is connected to the connection part 10. The rotor end 32 is rotatably arranged relative to the stator end 31. The third installation portion 321 is provided on the rotor end 32. The third installation portion 321 can be detachably connected to any one of the first installation portion 411 or the second installation portion 421. Therefore, by providing the first installation portion 411 and the second installation portion 421 at multiple positions of the clamping assembly 40, the third installation portion 321 of the motor assembly 30 can be connected to the first installation portion 411 or the second installation portion 421 at any position. 421, thereby realizing that the gimbal 1000 has multiple fixed positions, which can meet the diverse needs of mobile phone shooting modes and scenes. By ensuring that the clamping direction of the first ear clip 42 and the second ear clip 43 has multiple options relative to the rotation axis direction of the rotor end 32, it enables the shooting device to perform shooting or recording in various directions such as horizontal screen direction and vertical screen direction.

In one embodiment, the first ear clip 42 and the second ear clip 43 are arranged oppositely to the left and right sides of the clamping base 41. At the same time, the first ear clip 42 and the second ear clip 43 are provided with a clamping position 423 for holding the shooting device. The first ear clip 42 and the second ear clip 43 also include a pulling rod 4001 respectively. One end of each of the two pulling rods 4001 is correspondingly fixedly connected to the first ear clip 42 and the second ear clip 43, respectively, while the other end is elastically connected to the clamping base 41. The pulling rods are slidable in parallel relative to the clamping base 41. After being opened, the first ear clip 42 and the second ear clip 43 can clamp the shooting device.

Specifically, the inside of the clamping base 41 is provided with a first through hole 4002 for the pulling rod 4001 to pass through. The end of the pulling rod 4001 is provided with an installation structure 4003. The end face of the installation structure 4003 is provided with a limiting opening 4004. The pulling rod 4001 is sleeved with a spring 4005. a part of the spring 4005 is located on the pulling rod 4001, and the other part is connected to the limiting opening 4004 of the installation structure 4003. The limiting opening 4004 fixes and limits the spring 4005, so that the first ear clip 42 and the second ear clip 43 are elastically connected to the clamping base 41. In order to match the different sizes of the shooting device, when the clamping distance needs to be increased, forces can be applied on the first ear clip 42 and the second ear clip 43 in opposite directions horizontally outward, causing the pulling rod 4001 to pass through the first through hole 4002 inside the clamping base 41 to achieve elastic stretching. At this time, two first ear clips 42 and second ear clips 43 together with the clamping base 41 constitute the clamping area of the shooting device to extend the clamping distance of the first ear clip 42 and the second ear clip 43.

In one embodiment, the gimbal 1000 further includes a rod body 21. One end of the rod body 21 is hinged with an end of the connection part 10 away from the motor assembly 30 to form a connection hinge portion 2102. The height of the gimbal 1000 can be freely adjusted through the arrangement of the rod body 21. Specifically, the rod body 21 is a multi-section telescopic rod, and this arrangement enables the rod body 21 to drive the gimbal to achieve distance expansion and contraction in the length direction.

In one embodiment, the gimbal 1000 further includes a support assembly 20 that includes a leg base 22 and a support leg 24. The rod body 21 is mounted on the leg base 22 in a penetrating way. Specifically, one end of the support leg 24 is hinged with the leg base 22, and the other end of the support leg 24 is unfolded or folded relative to the leg base 22. Specifically, when the support legs 24 are unfolded, the plurality of support legs 24 are evenly distributed around the outer periphery of the leg base 22, which can enhance the stability of the support assembly 20; When the support legs 24 are folded, they can be contracted into a handle shape, making it easy to store and carry.

In addition, the leg base 22 is also provided with a rotation body 25, which can relatively rotate around the internal central axis of the rod body 21. The rotation body 25 can also be provided with a detachable control panel 26, and the control panel 26 is electrically connected to the motor assembly 30. The control panel 26 can generate a control signal, so that the control panel can cause the support assembly 20 to drive the shooting device to rotate to achieve shooting at different angles.

In one embodiment, the connection method between the third installation portion 321 of the motor assembly 30 and the first installation portion 411 and the second installation portion 421 of the clamping assembly 40 includes a boot mouth connection, a snap connection, a threaded connection or a magnetic connection.

Figure 12:
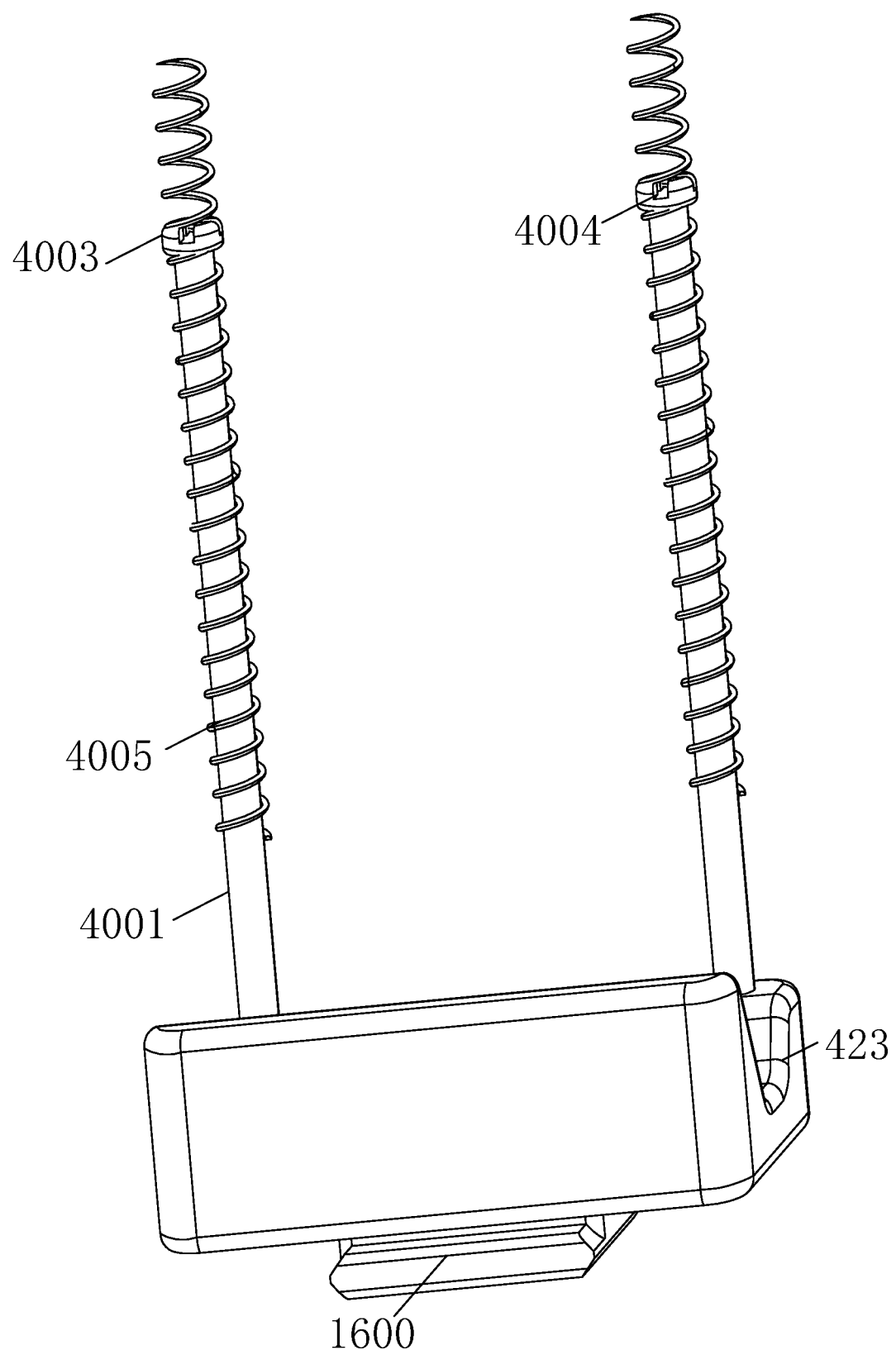
FIG. 12 is a structural schematic diagram of the first ear clip of FIG. 11.
Figure 13:
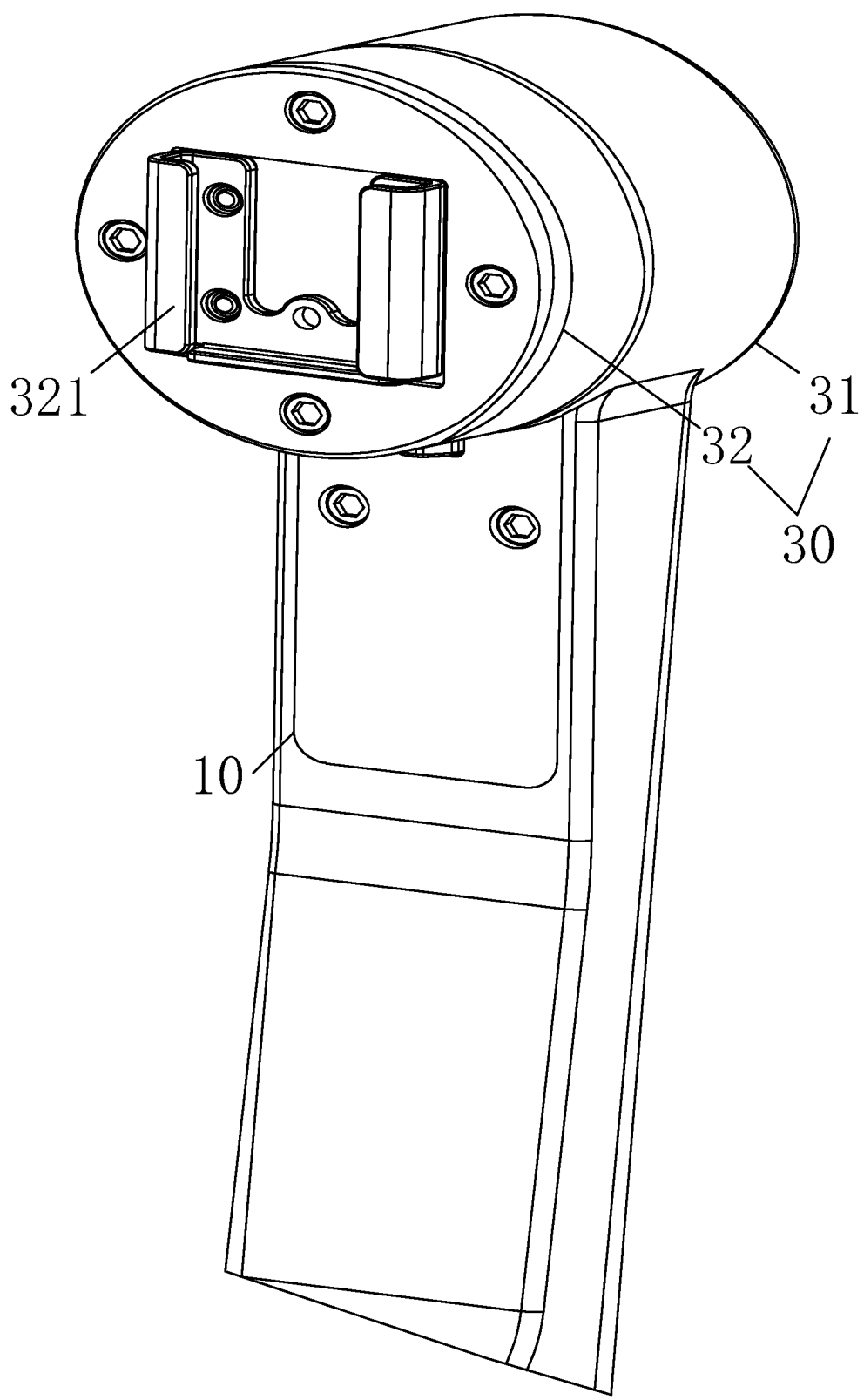
FIG. 13 is a perspective view of the motor assembly of FIG. 10.
Figure 14:
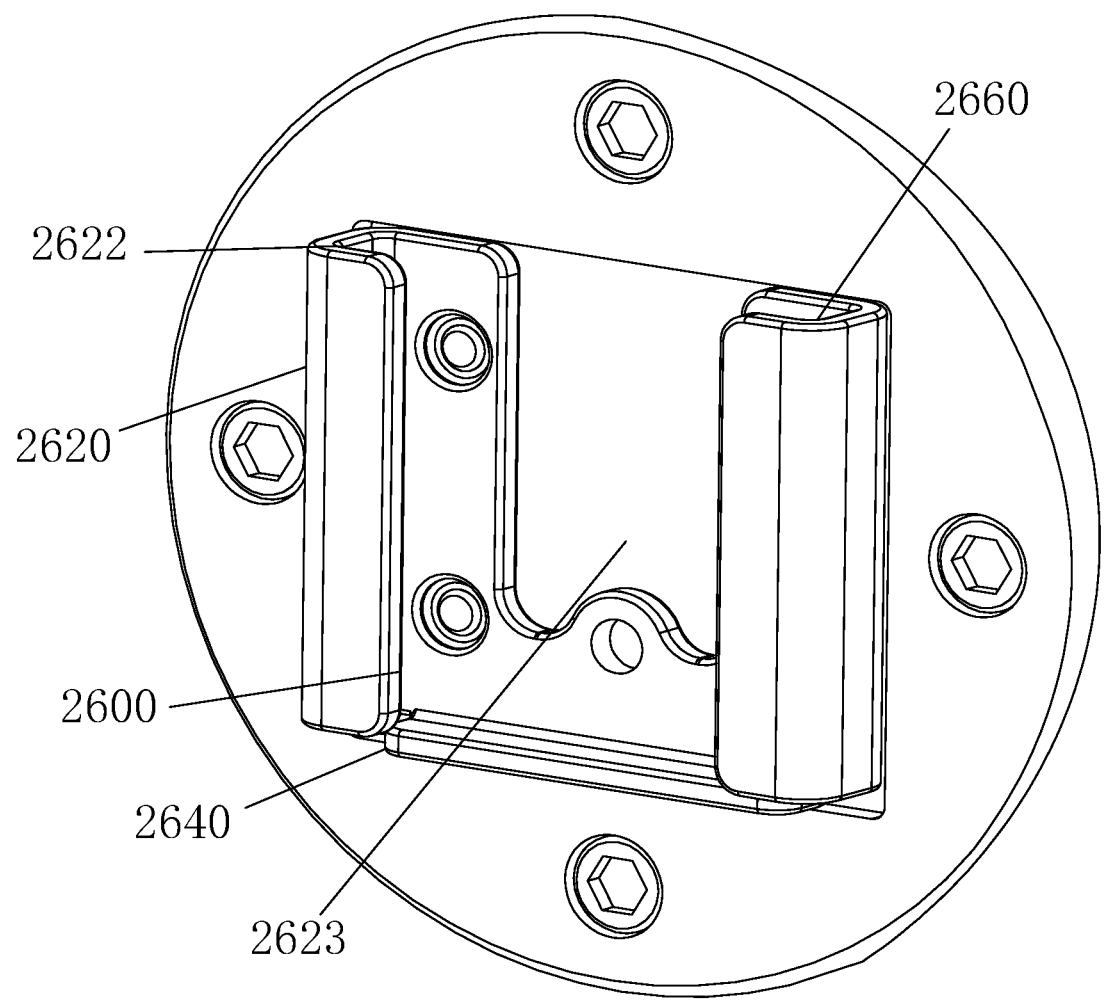
FIG. 14 is a schematic diagram of the end surface of the rotor end of FIG. 13.

Regarding the boot mouth connection, the structure of the boot mouth includes a male boot mouth 1600 and a female boot mouth 2600. The first installation portion 411 and the second installation portion 421 are one of the male boot mouth 1600 and the female boot mouth 2600. The third installation portion 321 is the other of the male boot mouth 1600 and the female boot mouth 2600. For example, as shown in FIGS. 12 and 14, the first installation portion 411 and the second installation portion 421 are the male boot mouth 1600, and the third installation portion 321 is the female boot mouth 2600. The female boot mouth 2600 includes two side plates 2620 and a bottom plate 2640. One end of each of the two side plates 2620 is connected to the bottom plate 2640, and the other ends form an opening 2660. A fixed slideway 2622 is provided in the two side plates 2620. The two side plates 2620 and the bottom plate 2640 are combined to form a clamping slot 2623, and the male boot mouth 1600 is a plate 4006 that is matingly connected to the female boot mouth 2600. Notches 4007 are provided at both ends of the side of the plate 4006 that is fixedly connected to the clamping assembly 40. The side of the plate 4006 that is opposite to the clamping assembly 40 is connected to the fixed slideway 2622 of the two side plates 2620 of the female boot mouth 2600, so that the male boot mouth 1600 and the female boot mouth 2600 are connected. Therefore, the first installation portion 411 or the second installation portion 421 and the third installation portion 321 can realize the boot mouth connection.

Regarding the snap connection, the snap connection method is a detachable connection method, and the structure of the snap connection includes a positioning part and a locking part. Specifically, the first installation portion 411 and the second installation portion 421 are one of the positioning part and the locking part, and the third installation portion 321 is the other one of the positioning part and the locking part. The positioning part can be a boss or other cylindrical structure, and the locking part is a shell structure that is matingly connected to the positioning part. The snap connection method is easy to assemble and saves unit cost. The snap connection between the first installation portion 411 or the second installation portion 421 and the third installation portion 321 is widely used in structural design.

Regarding the threaded connection, the structure of the threaded connection includes a positioning part and a connection part. Specifically, the first installation portion 411 and the second installation portion 421 are one of the positioning part and the connection part, and the third installation portion 321 is the other one of the positioning part and the connection part. The positioning part can be a cylindrical boss with a male thread on the outside of the cylindrical boss, the connection part is a recessed structure matching and connected with the positioning part, and at the same time, the recessed structure is internally provided with a female thread. By connecting the male threads on the positioning part with the female threads inside the recessed structure, a threaded connection can be achieved between the first installation portion 411 and the second installation portion 421. This connection method has a simple structure, is reliable, and is easy to assemble and disassemble.

Regarding the magnetic connection, the structure of the magnetic connection includes two magnets. The first installation portion 411 is one of the two magnets, and the second installation portion 421 is the other of the two magnets. When the different poles of the two magnets are close to each other, the eddy current of a magnet will interact with another heterogeneous magnet to produce a mutual attraction effect, so that the first installation portion 411 or the second installation portion 421 and the third installation portion 321 are connected. This connection method is convenient and fast, and does not require precise positioning. The connection between the two installation portions can be realized only by the automatic attraction of the positive and negative poles of the magnets, thus saving time.

The present invention provides a gimbal, which provides at least three usage forms of the gimbal.

Figure 15:
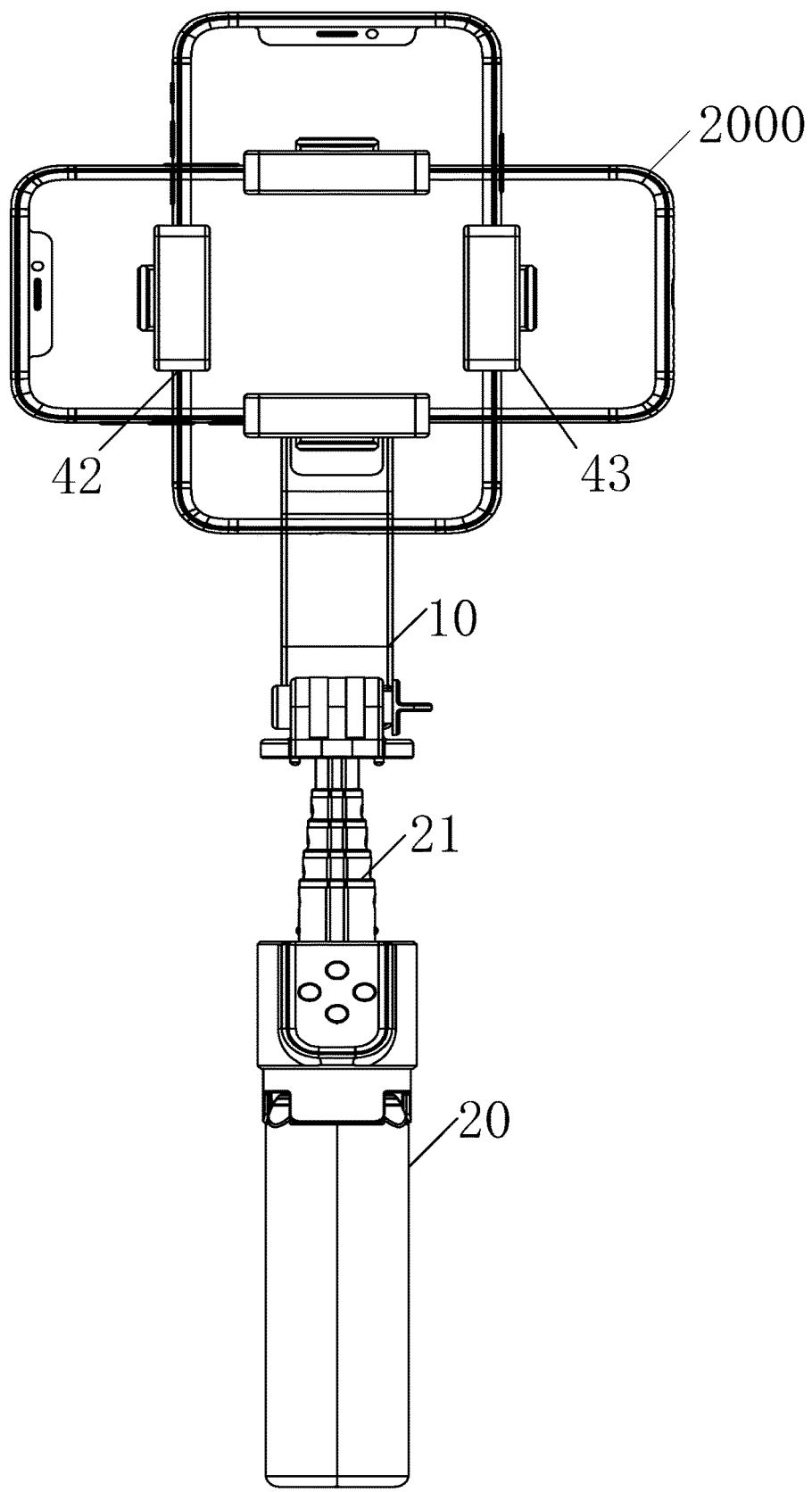
FIG. 15 is a schematic diagram of the gimbal with the first installation portion located on the back of the clamping assembly.
Figure 16:
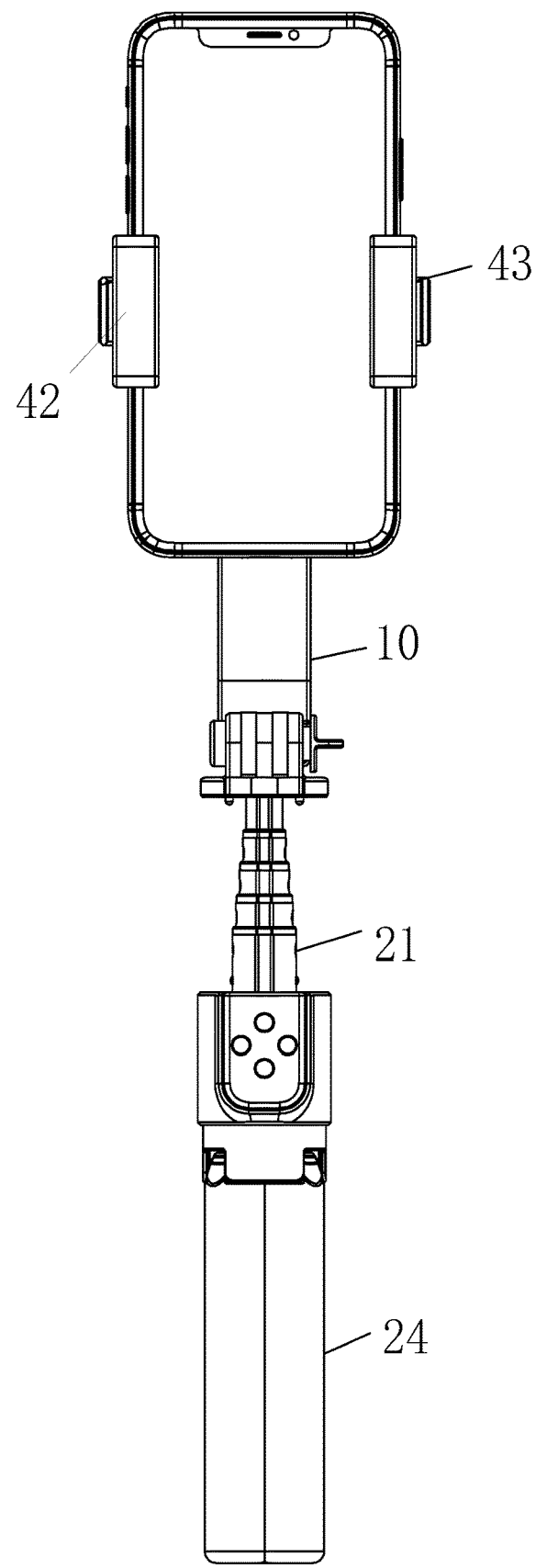
FIG. 16 is a schematic diagram of the gimbal when shooting in the portrait mode in FIG. 15.
Figure 17:
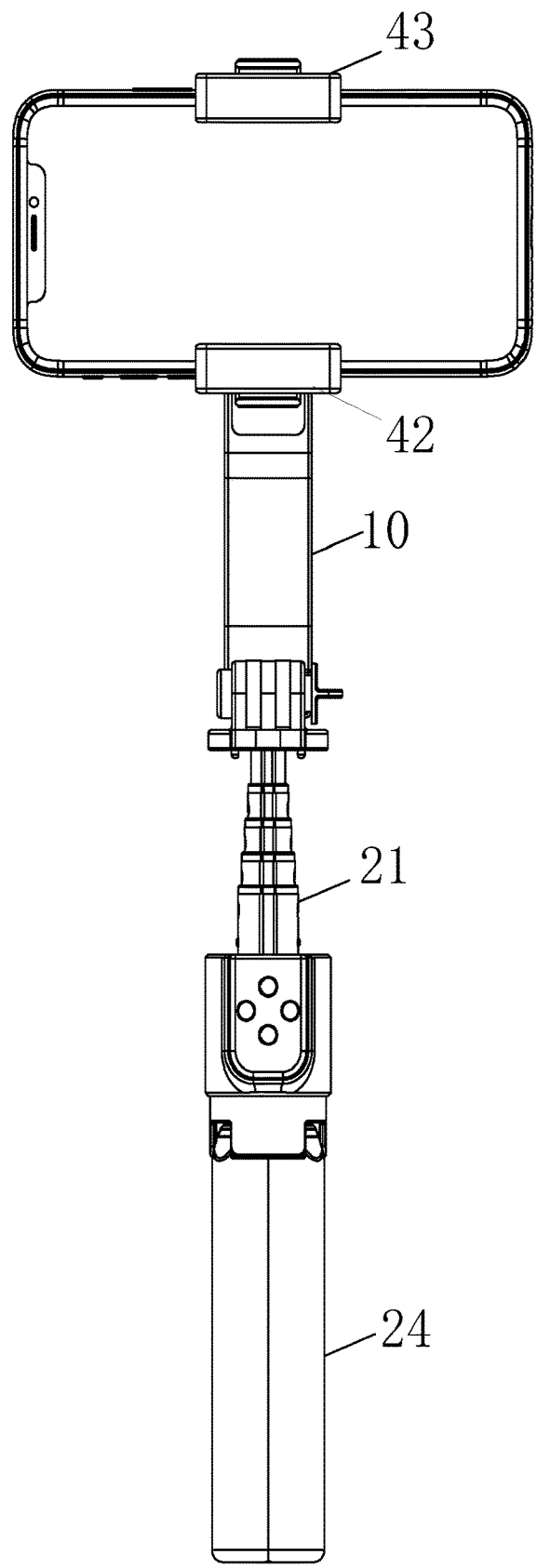
FIG. 17 is a schematic diagram of the gimbal when shooting in the landscape mode in FIG. 15.

As shown in FIG. 15, when the third installation portion 321 of the motor assembly 30 is connected to the first installation portion 411, and the first installation portion 411 is located on the back surface of the clamping base 41, i.e., on the opposite side relative to the fixed position of the shooting device: at this time, when the motor assembly 30 of the gimbal 1000 rotates, it can cause the first ear clip 42 and the second ear clip 43 to clamp the shooting device for rotation in the roll direction. As shown in FIGS. 16 and 17 respectively, when the first installation portion 411 is located on the back surface of the clamping base 41, after the third installation portion 321 is connected to the first installation portion 411, the shooting device clamped by the clamping assembly 40 can be used for shooting and video recording in portrait and landscape orientations, and the two states shown in FIGS. 16 and 17 can be switched.

Figure 19:
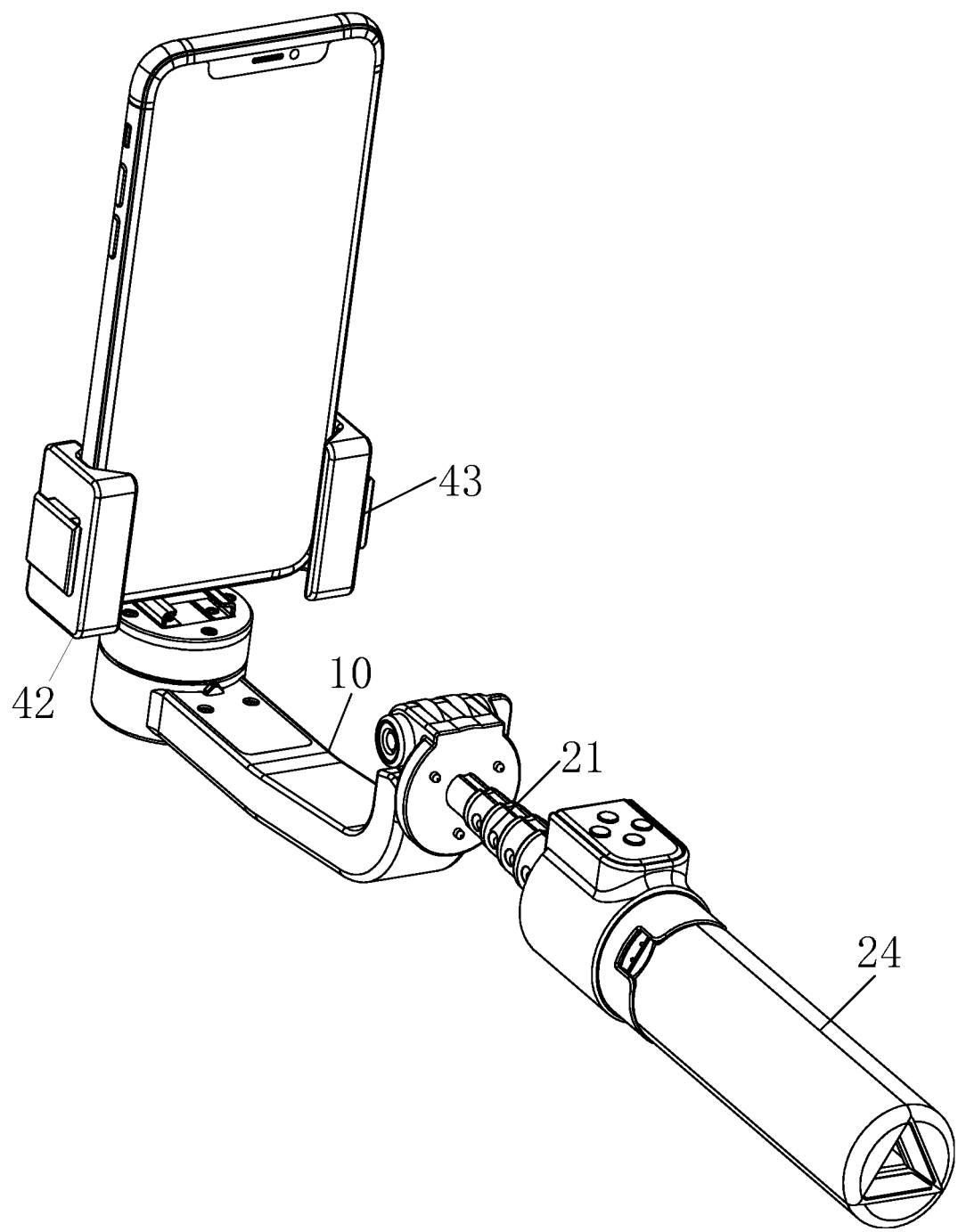
FIG. 19 is a schematic diagram of the gimbal with the first installation portion located on the lower end surface of the clamping assembly.

When the third installation portion 321 of the motor assembly 30 is connected to the first installation portion 411, and the first installation portion 411 is located on the upper and lower end surfaces of the clamping base 41: the end surface of the motor assembly 30 of the gimbal 1000 rotates parallel to the horizontal plane, and it can cause the first ear clip 42 and the second ear clip 43 to clamp the shooting device for rotation in the horizontal direction, referring to FIG. 19, which is a schematic diagram of the gimbal 1000 when the first installation portion 411 is located at the lower end surface of the clamping assembly 40.

Figure 18:
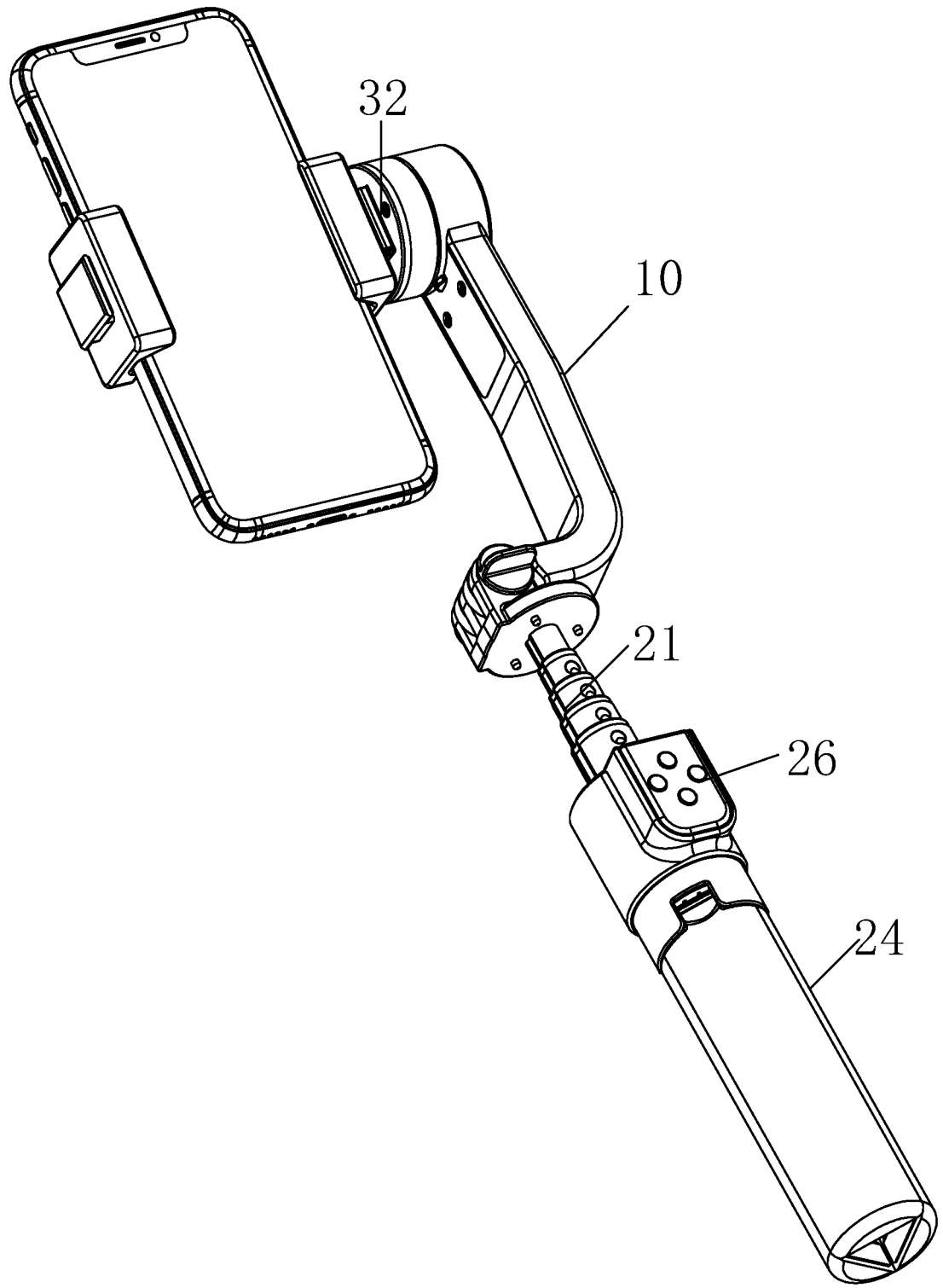
FIG. 18 is a schematic diagram of the gimbal with the first installation portion located on the side of the first ear clip.

When the third installation portion 321 of the motor assembly 30 is connected to the second installation portion 421, and the second installation portion 421 is located at at least one of the sides of the first ear clip 42 and the second ear clip 43: the rotation of the motor assembly 30 of the gimbal 1000 allows the first ear clip 42 and the second ear clip 43 to hold the shooting device to rotate in the pitch direction, referring to FIG. 18, which is a schematic diagram of the gimbal 1000 when the second installation portion 421 is located on the side of the first ear clip 42.

Figure 20:
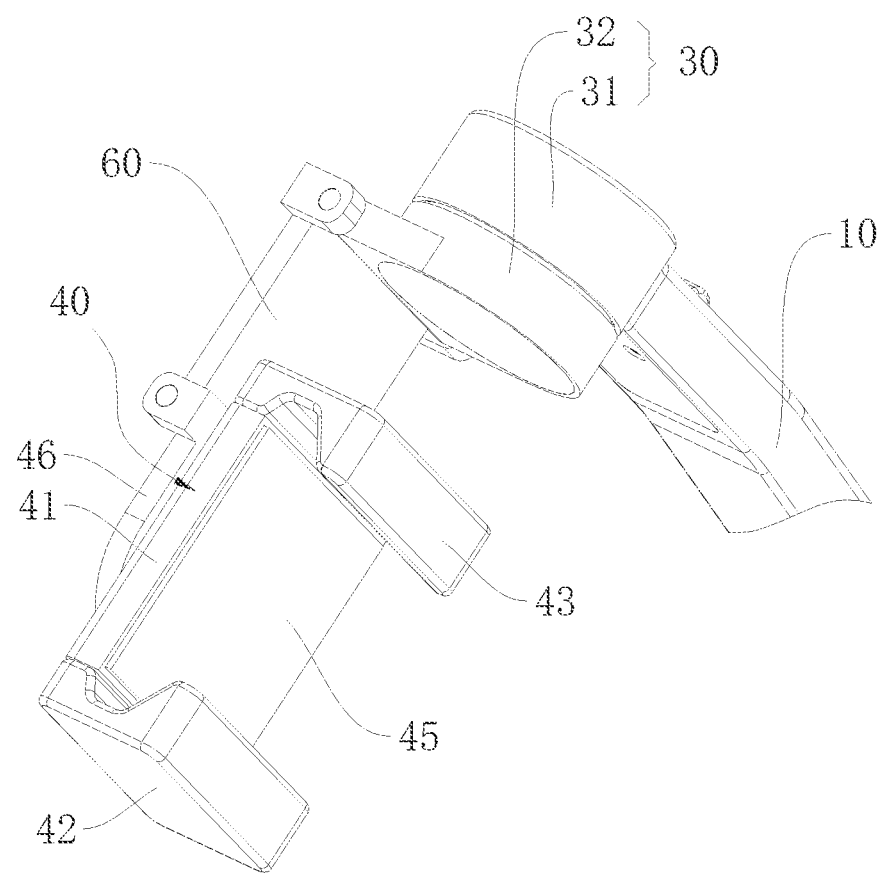
FIG. 20 is a schematic diagram of the three-dimensional structure of the clamping assembly according to an embodiment of the present invention.
Figure 21:
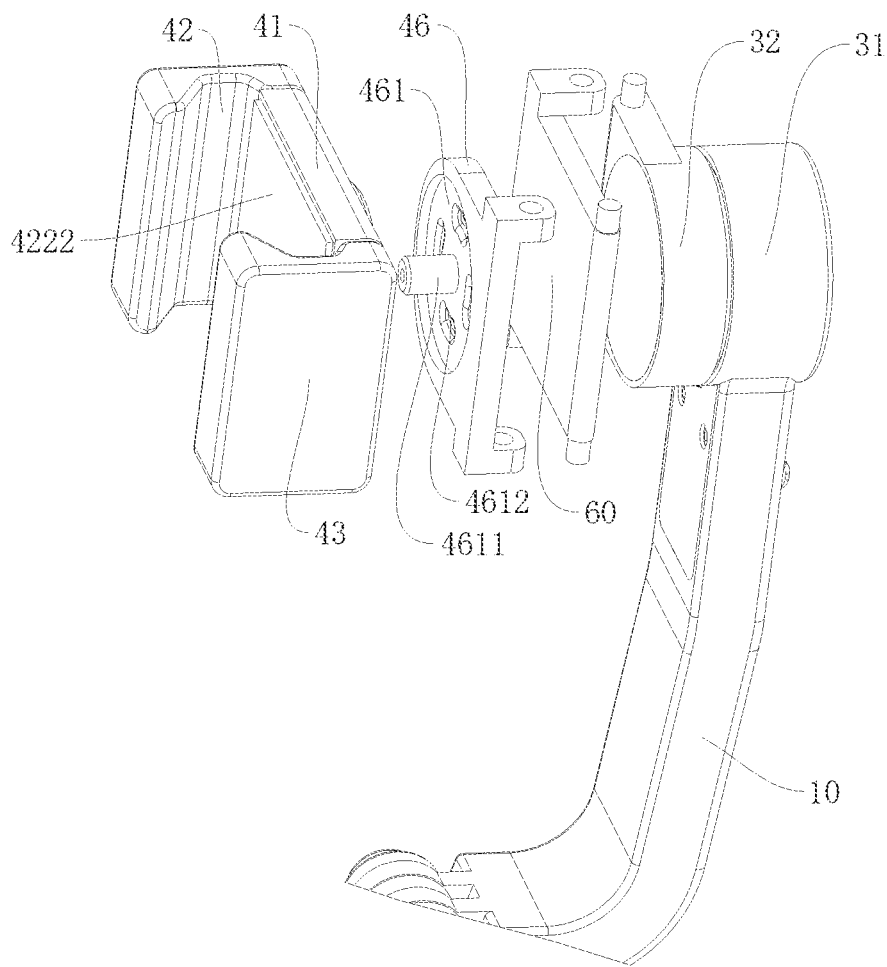

The above are only the best embodiments of the present invention, and are not intended to limit the scope of the present invention as shown in FIGS. 20 and 21. All equivalent changes or modifications made according to the scope of the claims of the present invention are covered by the present invention.

Another embodiment of the present invention provides a gimbal. The gimbal 1000 includes a connection part 10, a motor assembly 30, an adapter arm 60, a clamping assembly 40 and a support assembly 20. The motor assembly 30 is mounted at one end of the connection part 10. One end of the adapter arm 60 is rotatably connected to the motor assembly 30, and the other end is rotatably connected to the clamping assembly 40, so that the angle between the clamping assembly 40 and the adapter arm 60, and the angle between the adapter arm 60 and the motor assembly 30 can be rotatably adjusted.

The motor assembly 30 includes a stator end 31 and a rotor end 32. The stator end 31 is fixed on a side of the connection part 10. The rotor end 32 is rotatable relative to the stator end 31 to drive the adapter arm 60 and the clamping assembly 40 to rotate.

The clamping assembly 40 is used to clamp the shooting device 2000 so that the shooting device 2000 can rotate in the roll direction and the yaw direction on the clamping assembly 40.

The support assembly 20 is connected to the other end of the connection part 10.

To sum up, compared with the existing technology, the gimbal 1000 has at least the following beneficial effects:

For the gimbal 1000, the clamping assembly 40 and the rotor end of the motor assembly 30 are connected through an adapter arm 60, the user can thus adjust the position and angle of the clamping assembly 40 relative to the rotor end 32 of the motor assembly 30 to facilitate shooting, so that the shooting device 2000 can shoot at different postures and angles on the clamping assembly 40, which improves the flexibility of shooting and the diversity of scenes. At the same time, by controlling the rotation of the motor assembly 30, the shooting device 2000 can be better stabilized in different scenarios, adapting to different shooting angles and scenes, and achieving multi-angle stabilization of the gimbal 1000, thereby improving the quality of the shooting. In addition, the gimbal 1000 has a simple structure, is easy to manufacture and use, and has good practicality.

In order to enable those skilled in the art to better understand the solutions of the present invention, the technical solutions in the embodiments of the present invention will be clearly and completely described below with reference to FIGS. 20 to 27.

Furthermore, as a specific embodiment of some embodiments of the present invention, as shown in FIGS. 20 and 21, the adapter arm 60 is rotatably connected to the rotor end 32 and the clamping assembly 40 with damping, so that the adapter arm 60 can be rotated to any angle with respect to the clamping assembly 40 and the rotor end 32 of the motor assembly 30 and then fixed, to better meet the user's need for adjusting the angular position of the shooting device 2000 on the clamping assembly 40.

Furthermore, as a specific embodiment of some embodiments of the present invention, as shown in FIGS. 20 and 21, the axis directions of the adapter shafts on the adapter arm 60, connecting to the rotor end 32 and the clamping assembly 40, are perpendicular to the rotational axis of the motor assembly 30, so that the gimbal 1000 can adjust the position and angle of the clamping assembly 40 relative to the motor assembly 30 through the adapter arm 60.

Figure 22:
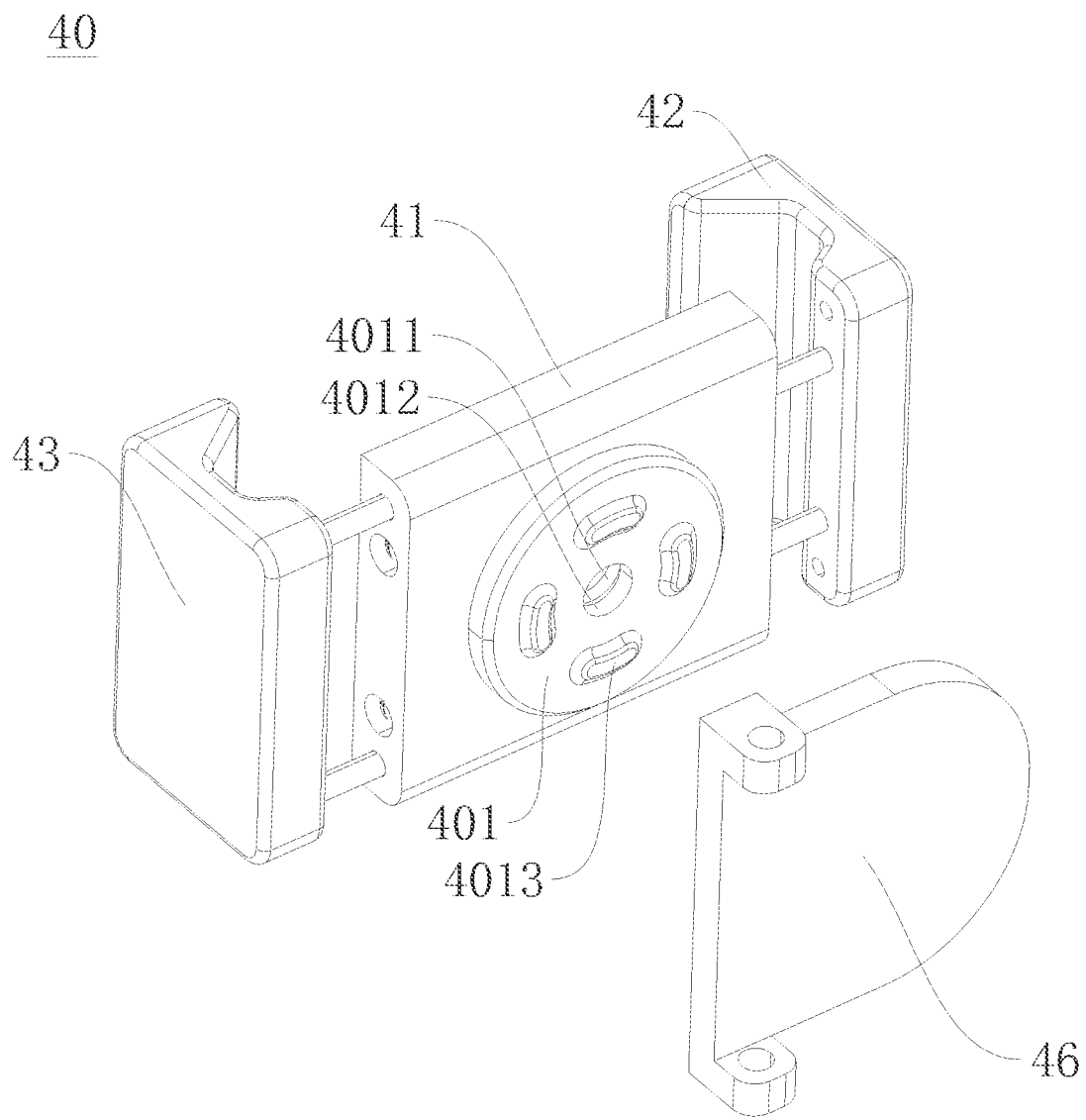
FIG. 22 is an exploded schematic diagram of the clamping assembly in FIG. 20.
Figure 23:
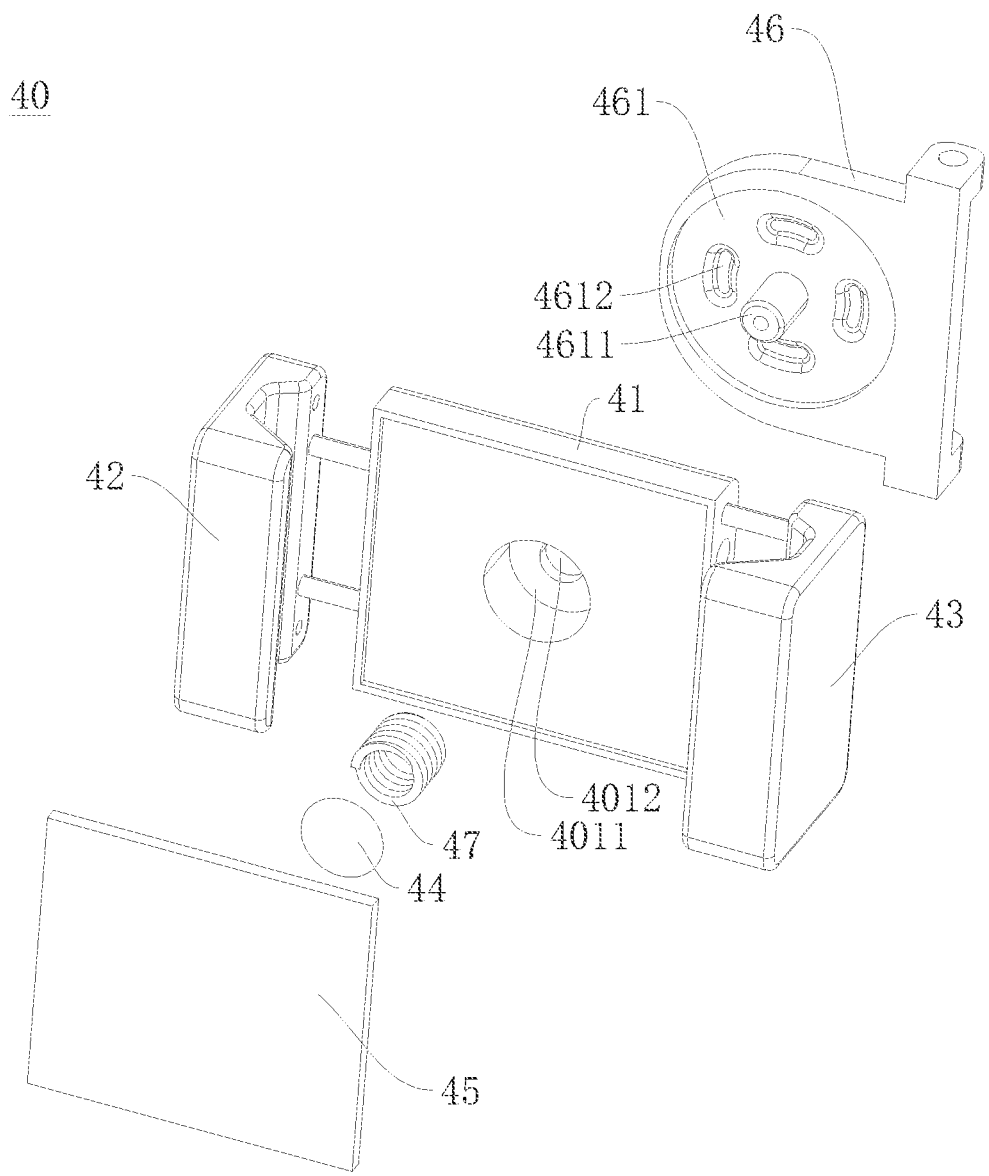
FIG. 23 is another exploded schematic diagram of the clamping assembly in FIG. 20.

Furthermore, as a specific embodiment of some embodiments of the present invention, as shown in FIGS. 21, 22 and 23, the clamping assembly 40 includes a rotation base 46 and a clamping base 41, the rotation base 46 is rotatably connected to the other end of the adapter arm 60, and the clamping base 41 is mounted on the rotation base 46. When the shooting device 2000 is clamped on the clamping assembly 40, the clamping base 41 abuts against the back of the shooting device 2000.

Further, as a specific implementation in some embodiments of the present invention, as shown in FIGS. 20 and 21, the clamping assembly 40 also includes two first ear clips 42 and second ear clips 43, and the clamping base 41 is rotatably mounted on the rotation base 46, the first ear clip 42 and the second ear clip 43 are symmetrically and elastically connected to the left and right sides of the clamping base 41, and can slide in parallel relative to the clamping base 41 respectively, so as to clamp the shooting device 2000 from both sides of the shooting device 2000.

It is easy to understand that the second ear clip 43 cooperates with the first through hole 4002 provided on the clamping base 41 through the pulling rod 4001 to achieve parallel sliding relative to the clamping base 41. A spring 4005 is connected between the second ear clip 43 and the clamping base 41 to achieve elastic connection relative to the clamping base 41.

Further, as a specific implementation in some embodiments of the present invention, as shown in FIG. 23, the clamping assembly 40 also includes an elastic part 47. The elastic part 47 is connected to the rotation base 46 and the clamping base 41 respectively, so that the rotation base 46 is relatively elastically connected to the clamping base 41, and the clamping base 41 can elastically move relative to the rotation base 46.

Furthermore, as a specific embodiment of some embodiments of the present invention, as shown in FIGS. 21, 22 and 23, a first rotation portion 461 is provided on the rotation base 46, and a second rotation portion 401 is provided on the clamping base 41. The clamping base 41 and the rotation base 46 are rotatably connected through the cooperation of the first rotation portion 461 and the second rotation portion 401, and the clamping base 41 can rotate 360 degrees around the rotation base 46, so that the shooting device 2000 fixed on the clamping assembly 40 can switch between landscape and portrait shooting angles.

Furthermore, as a specific embodiment of some embodiments of the present invention, as shown in FIG. 23, the clamping assembly 40 further includes a limiting member 44, a connection pole 4611 is protrudingly provided on the first rotation portion 461, and a counterbore 4011 and a second through hole 4012 located at the bottom of the counterbore 4011 are provided on the second rotation portion 401, corresponding to the connection pole 4611. The connection pole 4611 passes through the second through hole 4012 and is located in the counterbore 4011. An elastic part 47 is located in the counterbore 4011 and is sleeved on the connection pole 4611. The limiting member 44 is fixed at the end of the connection pole 4611 and abuts against one end of the elastic part 47, and the other end of the elastic part 47 abuts against the bottom of the counterbore 4011, so that the clamping base 41 and the rotation base 46 are elastically connected.

It should be noted that the connection pole 4611 passes through the second through hole 4012 and is located in the counterbore 4011, the connection pole 4611 can slide within the counterbore 4011, and the end of the connection pole 4611 is fixedly connected with a limiting member 44. The cross-sectional area of the limiting member 44 is larger than the size of the second through hole 4012, therefore the connection pole 4611 cannot slide out of the second through hole 4012, thereby realizing radial and axial positioning of the connection pole 4611, so that the clamping base 41 can rotate relative to the rotation base 46 around the connection pole 4611 in a circumferential direction, and can axially move relative to the rotation base 46 in the connection pole 4611 within the length range of the connection pole 4611.

Further, as a specific implementation in some embodiments of the present invention, as shown in FIGS. 20 and 21, the surface of the clamping base 41 opposite to the second rotation portion 401 is an abutment end face for abutting against the back of the shooting device 2000.

Further, as a specific implementation in some embodiments of the present invention, in order to protect the shooting device 2000 and improve the clamping stability of the clamping assembly 40, as shown in FIG. 4, a self-adhesive pad 45 is provided on the abutment end surface of the clamping base 41. The self-adhesive pad 45 is flexible and can buffer the contact and collision with the shooting device 2000 while increasing the friction force with the back of the shooting device 2000, making the shooting device 2000 more securely when clamped on the clamping assembly 40.

Furthermore, as a specific embodiment of some embodiments of the present invention, as shown in FIGS. 21, 22, and 23, one of the first rotation portion 461 and the second rotation portion 401 is provided with at least two limiting projections 4013, and the other has corresponding limiting grooves 4612 that match the limiting projections 4013 in positions and numbers. When the clamping base 41 is connected to the rotation base 46, the limiting projections 4013 and the limiting grooves 4612 cooperate with each other. When the clamping base 41 rotates relative to the rotation base 46, the limiting projections 4013 can slide from one limiting groove 4612 to another adjacent limiting groove 4612 for cooperation.

Specifically, in this embodiment, as shown in FIG. 22, the first rotation portion 461 is provided with four limiting projections 4013. The four limiting projections 4013 are evenly annularly arranged around the first rotation portion 461. Four limiting grooves 4612 are also correspondingly provided on the second rotation portion 401 to cooperate with the four limiting projections 4013. Each limiting projection 4013 is set at an angle of 90 degrees from each other, so that the clamping base 41 can rotate clockwise or counterclockwise by 90 degrees relative to the rotation base 46, so that the shooting device 2000 being clamped can be switched between landscape orientation and portrait orientation.

It should be noted that the limiting projections 4013 and the limiting grooves 4612 are set with rounded corners at the edges, as shown in FIGS. 21 to 23, so that when the limiting projections 4013 and the limiting grooves 4612 are disengaged from each other or re-engaged, they move more smoothly.

It can be understood that the clamping assembly 40 clamps the shooting device 2000 through the clamping base 41, the first ear clip 42 and the second ear clip 43. The clamping base 41 can rotate relative to the rotation base 46 to switch the shooting angle of the shooting device 2000. When it is necessary to switch angles, the clamping base 41 is directly rotated, and under the action of force, the limiting projections 4013 and the limiting grooves 4612 are disengage from each other, and when the clamping base 41 is rotated to the position where the limiting projection 4013 corresponds to another adjacent limiting groove 4612, they are re-engaged, and under the action of the elastic part 47, the clamping base 41 and the rotation base 46 are close to each other and firmly connected.

The support assembly 20 of the embodiment of the present invention includes a leg base 22, at least three support legs 24, a rotation body 25 and a telescopic rod body 21. The leg base 22 has a connection end 210a, and the rotation body 25 is mounted at the connection end 210a of the leg base 22. One end of the rod body 21 is also inserted into the connection end 210a of the leg base 22 and is fixedly connected to the leg base 22, and the other side of the rod body 21 is rotatably connected to the other end of the connection part 10.

Further, as a specific implementation in some embodiments of the present invention, as shown in FIGS. 5 to 8, the rod body 21 includes a rod main body 2101 and a hinge portion 2102. One end of the rod main body 2101 is connected to the connection end 210a of the leg base 22, and the other end is fixedly connected to the hinge portion 2102. The hinge portion 2102 is adjustably rotatably connected to the connection part 10.

Figure 7:
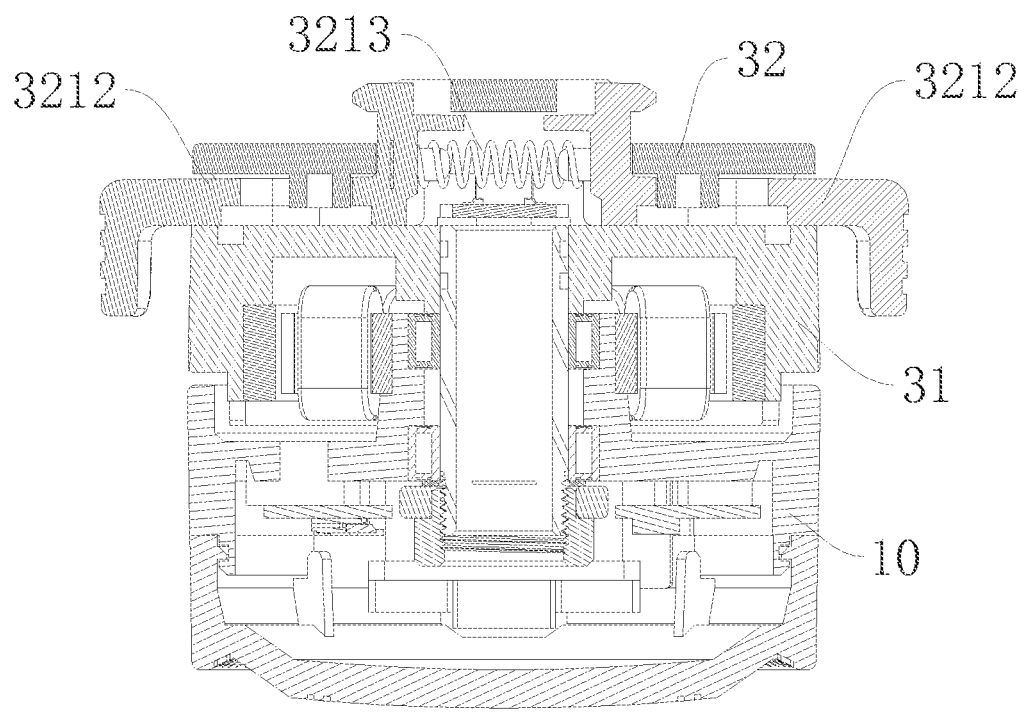
FIG. 7 is a schematic diagram of a cross-sectional structure of the gimbal in FIG. 1.

Further, as a specific implementation in some embodiments of the present invention, as shown in FIGS. 5 and 7, the opposite surfaces of the hinge portion 2102 and the connection end 210a are respectively provided with a snap-fit post 21021 and a snap-fit hole 210a1. When the rod main body 2101 is in the retracted state, the hinge portion 2102 abuts the connection end 210a of the leg base 22, and the snap-fit post 21021 and the snap-fit hole 210a1 are interference-fitted to achieve the snap-fit, so that the gimbal 1000 is in the collapsed state.

It is easy to understand that, as shown in FIGS. 24 to 27, the rod main body 2101 is a telescopic pole.

It can be seen that the length of the gimbal 1000 can be adjusted through the rod main body 2101. The user can adjust the length of the rod main body 2101 according to different usage scenarios, thereby adjusting the shooting range of the shooting device 2000 on the gimbal 1000, thereby improving the user's selfie experience.

Further, as a specific implementation in some embodiments of the present invention, as shown in FIGS. 24 to 27, the leg base 210 includes a leg base 22 and at least three support legs 24. The support legs 24 are rotatably connected to the leg base 22, and evenly distributed around the outer periphery of the leg base 22 for unfolding or folding. When the support legs 24 are unfolded, the leg base 22 serves as a tripod, and the gimbal 1000 can be stably placed. When the support legs 24 are folded, the support member serves as a handle, and the gimbal 1000 can be used handheld.

Further, as a specific implementation in some embodiments of the present invention, as shown in FIGS. 24 to 27, the support assembly 20 also includes a control panel 26. The control panel 26 is detachably provided on the rotation body 25. The control panel 26 is used to control the rotation of the motor assembly 30.

Further, as a specific implementation in some embodiments of the present invention, the rotation body 25 sleeved on the connection end 210a can rotate relative to the leg base 22 around the axis of the rod body 21 to change the position of the control panel on the rotation body 25, which is convenient for users to grab the gimbal 1000 from different angles.

Figure 24:
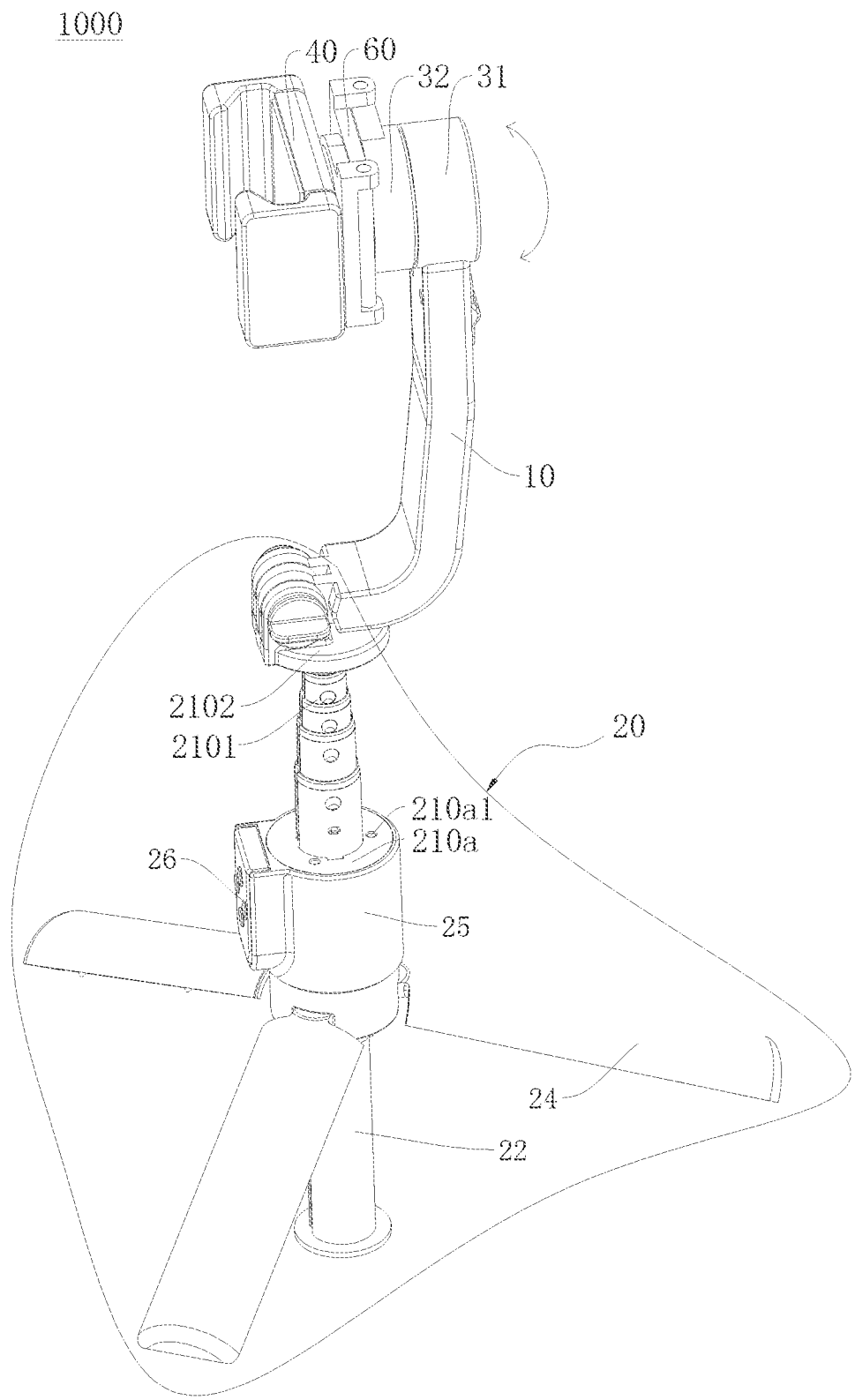
FIG. 24 is a schematic diagram of the three-dimensional structure of the gimbal according to an embodiment of the present invention.
Figure 25:
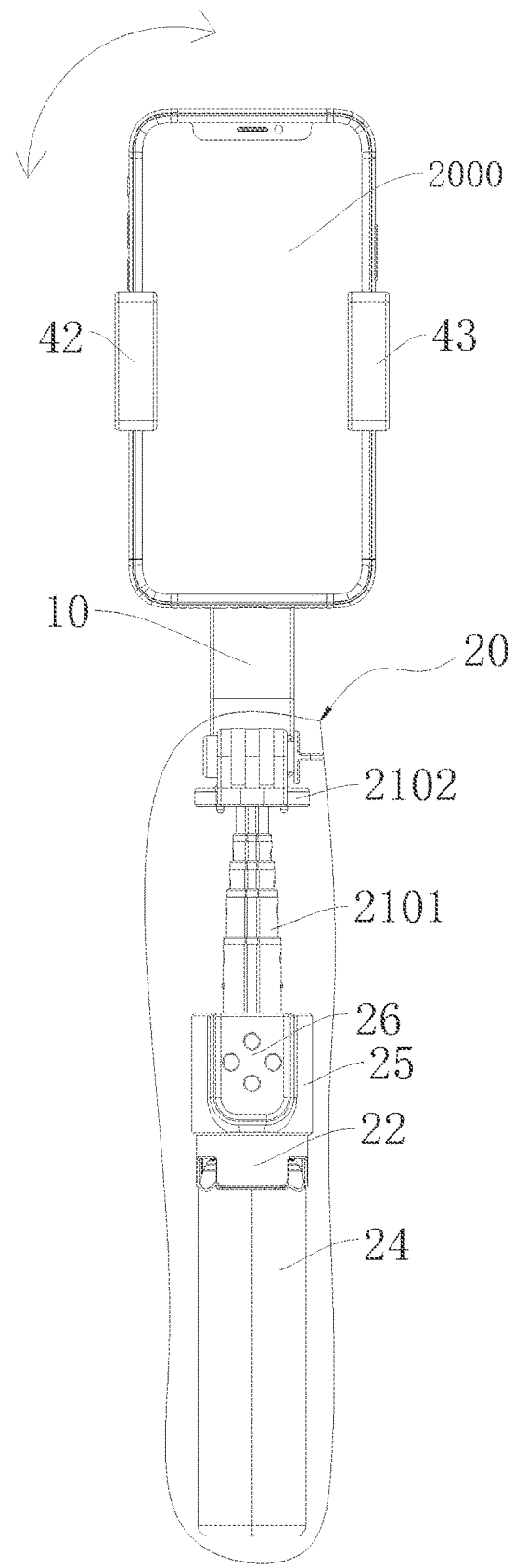
FIG. 25 is a schematic diagram of the three-dimensional structure of the gimbal combined with the shooting device in FIG. 24.

In summary, the present invention provides a gimbal 1000, which provides at least three usage forms of the gimbal 1000:

1. When the clamping base 41 is rotated through the connection between the rotation base 46 and the adapter arm 60 until the abutment end surface of the clamping base 41 is perpendicular to the rotational axis of the motor assembly 30. In other words, the adapter arm 60 is rotated to be parallel and close to the end face of the rotor end 32. The rotation base 46 is rotated to be parallel and close to the adapter arm 60, and the rotation base 46 is located on the side of the adapter arm 60 opposite to the rotor end 32, and the clamping base 41 is located on the side of the rotation base 46 opposite to the adapter arm 60. That is, the rotor end 32, the adapter arm 60, and the rotation base 46 are Z-shaped and folded together. In the above-mentioned state of the gimbal 1000, as shown in FIGS. 24 and 25, the clamping assembly 40 can adjust the rotation of the shooting device 2000 in the roll direction through the motor assembly 30.

Figure 26:
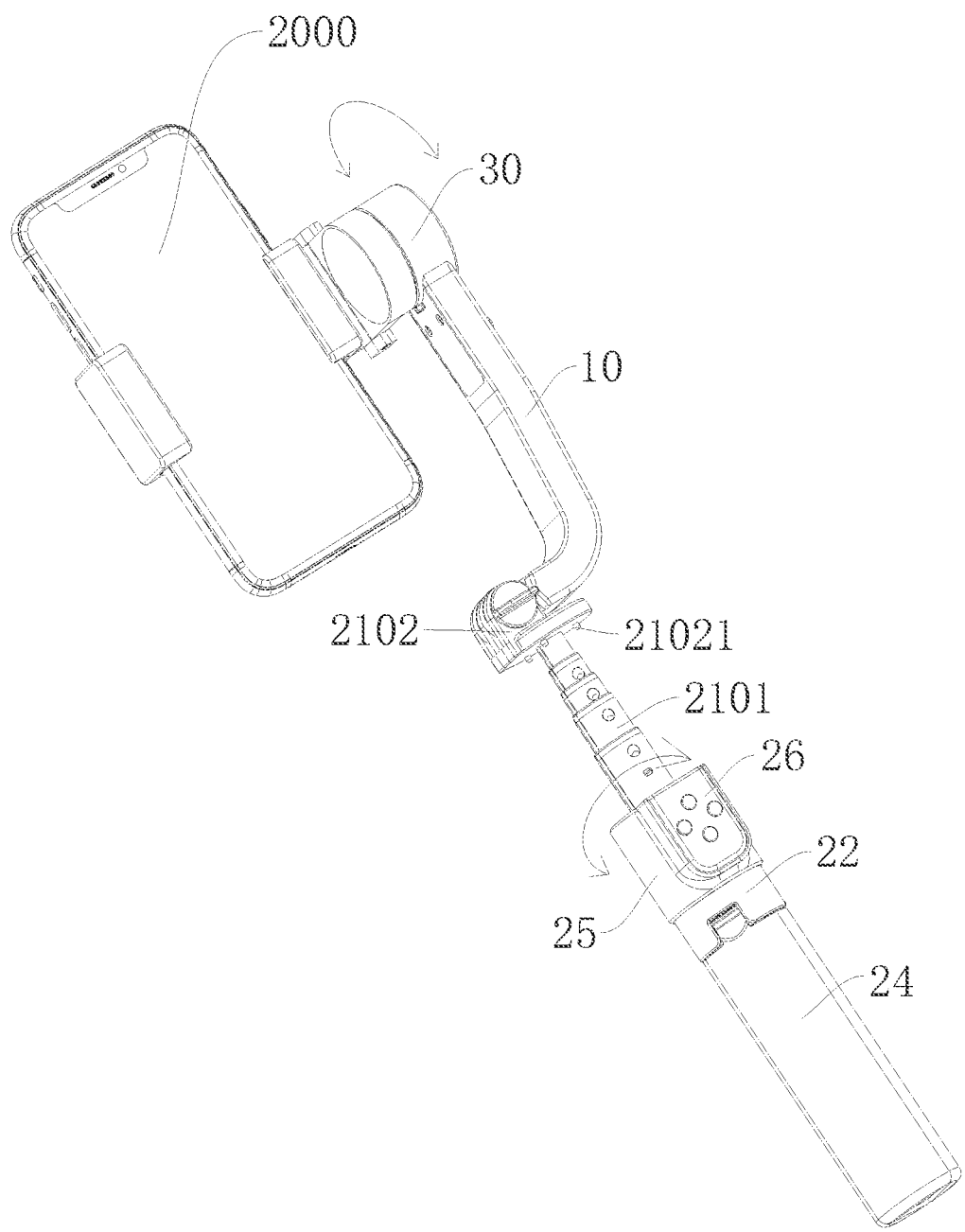
FIG. 26 is a schematic diagram of the three-dimensional structure of the gimbal combined with the shooting device in a state in FIG. 25.

2. When the clamping base 41 is rotated through the rotation of the rotation base 46 and the adapter arm 60 until the abutment end surface of the clamping base 41 is parallel to the rotational axis of the motor assembly 30, and the rotational axis of the motor assembly 30 is parallel to the horizontal plane at the same time. In other words, the adapter arm 60 is rotated to form an acute angle or 90 degrees with the end surface of the rotor end 32, and the rotation base 46 is rotated to be parallel to the adapter arm 60 and unfolded to form an obtuse angle or 180 degrees, while the rotational axis of the motor assembly 30 is parallel to the horizontal plane. In the above-mentioned state of the gimbal 1000, as shown in FIG. 26, the clamping assembly 40 can adjust the rotation of the shooting device 2000 in the pitch direction through the motor assembly 30.

Figure 27:
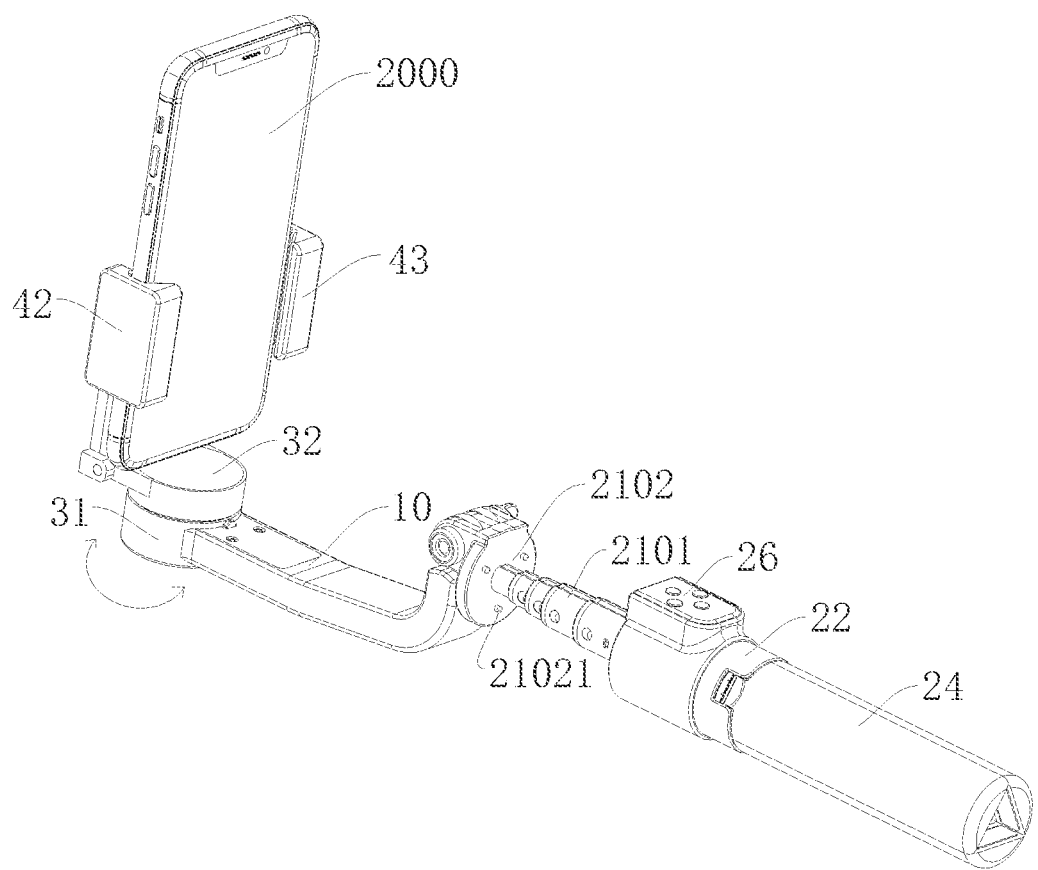
FIG. 27 is a schematic diagram of the three-dimensional structure of the gimbal combined with the shooting device in another state in FIG. 25.

3. When the clamping base 41 is rotated through the connection of the rotation base 46 and the adapter arm 60, until the abutment end surface of the clamping base 41 is parallel to the rotational axis of the motor assembly 30, and the rotational axis of the motor assembly 30 is perpendicular to the horizontal plane at the same time. In other words, the adapter arm 60 is rotated to form an acute angle or 90 degrees with the end surface of the rotor end 32, and the rotation base 46 is rotated to be parallel to the adapter arm 60 and unfolded to form an obtuse angle or 180 degrees, while the rotational axis of the motor assembly 30 is perpendicular to the horizontal plane. In the above-mentioned state of the gimbal 1000, as shown in FIG. 27, the clamping assembly 40 can adjust the rotation of the shooting device 2000 in the horizontal direction through the motor assembly 30.

Another embodiment of the present invention provides a gimbal. As shown in FIGS. 20 and 21, the gimbal 1000 includes a connection part 10, a motor assembly 30, an adapter arm 60, a clamping assembly 40, and a support assembly 20. The motor assembly 30 includes a stator end 31 and a rotor end 32. The stator end 31 is fixed on one end of the connection part 10, and the rotor end 32 rotates relative to the stator end 31. An end of the adapter arm 60 is rotatably connected to the rotor end 32; and the clamping assembly 40 is connected to the other end of the adapter arm 60, which is used to hold the shooting device. The support assembly 20 is mounted on the other end of the connection part 10. The clamping assembly 40 can be mounted on the motor assembly 30 in the first direction, and drive the shooting device to rotate in the roll direction; or, the clamping assembly 40 can be mounted on the motor assembly 30 in the second direction, and drive the shooting device to rotate in the horizontal direction.

The gimbal 1000 connects the clamping assembly 40 and the rotor end of the motor assembly 30 through an adapter arm 60, allowing users to adjust the position and angle of the clamping assembly 40 relative to the rotor end 32 of the motor assembly 30. This enables the shooting device 2000 to be shot at different angles on the clamping assembly 40, improving the flexibility and diversity of shooting scenes. At the same time, the clamping assembly 40 can be mounted on the motor assembly 30 in a first direction and drive the shooting device to rotate in the roll direction; or, the clamping assembly 40 can be mounted on the motor assembly 30 in a second direction and control the rotation of the motor assembly 30, driving the shooting device to rotate in the horizontal direction. This allows the shooting device 2000 to achieve better stabilization in different scenarios, adapting to different shooting angles and scenes, realizing multi-angle stabilization of the gimbal 1000, and thus improving the shooting quality. Moreover, the gimbal 1000 has a simple structure, is easy to manufacture and use, and has good practicality.

The gimbal 1000 also has the same structure and beneficial effects as the gimbal in the above embodiment, which will not be described again here.

What is claimed is:

1. A gimbal, comprising:
  a connection part (10);
  a support assembly (20), the support assembly (20) being mounted on one end of the connection part (10);
  a motor assembly (30), the motor assembly (30) being mounted on the other end of the connection part (10);
  a clamping assembly (40), the clamping assembly (40) being detachably mounted on the motor assembly (30) and used to clamp a shooting device;
  the clamping assembly (40) is configured to be mounted on the motor assembly (30) in a first direction and driving the shooting device to rotate in a roll direction; or
  the clamping assembly (40) is configured to be mounted on the motor assembly (30) in a second direction and driving the shooting device to rotate in a horizontal direction, wherein
  the clamping assembly (40) is provided with a first installation portion (411) and a second installation portion (421), and an action axis of the first installation portion (411) is perpendicular to an action axis of the second installation portion (421);
  the motor assembly (30) is provided with a third installation portion (321) that cooperates with the first installation portion (411) and the second installation portion (421);
  in the first direction, the clamping assembly (40) is configured to be mounted on the motor assembly (30) through cooperation of the first installation portion (411) and the third installation portion (321); or
  in the second direction, the clamping assembly (40) is configured to be mounted on the motor assembly (30) through cooperation of the second installation portion (421) and the third installation portion (321).

2. The gimbal according to claim 1, wherein
  the clamping assembly (40) comprises a clamping base (41), a first ear clip (42) and a second ear clip (43), the first ear clip (42) and the second ear clip (43) are respectively slidably arranged on opposite ends of the clamping base (41);
  the first installation portion (411) is arranged on a side of a back surface, an upper end surface or a lower end surface of the clamping base (41) facing the motor assembly, and the second installation portion is arranged on a side of the first ear clip (42) or the second ear clip (43) away from the clamping base (41); and
  the clamping base (41) is configured to be mounted on the motor assembly through the cooperation of the first installation portion (411) and the third installation portion (321), and the first ear clip (42) or the second ear clip (43) is configured to be mounted on the motor assembly (30) through the cooperation of the second installation portion (421) and the third installation portion (321).

3. The gimbal according to claim 2, wherein
  the motor assembly (30) comprises a stator end (31) and a rotor end (32), the stator end (31) is arranged on the connection part (10), and the rotor end (32) is rotatably arranged on the stator end (31); and
  wherein the third installation portion (321) is arranged on a side of the rotor end (32) away from the stator end (31).

4. The gimbal according to claim 3, wherein
  the third installation portion (321) comprises an alignment part (3211) and a buckling part (3212), the alignment part (3211) is mounted on the rotor end (32), and the buckling part (3212) is movably mounted on the rotor end (32);
  the first installation portion (411) comprises a first alignment groove (4111) and a first buckling groove (4112), the first alignment groove (4111) is arranged on the clamping base (41), and the first buckling groove (4112) is opened on a groove wall (4111) of the first alignment groove; when the first installation portion (411) and the third installation portion (321) are connected to each other, the alignment part (3211) and the buckling part (3212) are both clamped in the first alignment groove (4111), and the buckling part (3212) is extendable into or retractable from the first buckling groove (4112);
  the second installation portion (421) comprises a second alignment groove (4211) and a second buckling groove (4212), the second alignment groove (4211) is arranged on the first ear clip (42), and the second buckling groove (4212) is opened on the groove wall of the second alignment groove (4211); and
  when the second installation portion (421) and the third installation portion (321) are connected to each other, the alignment part (3211) and the buckling part (3212) are both clamped in the second alignment groove (4211), and the buckling part (3212) is extendable into or retractable from the second buckling groove (4212).

5. The gimbal according to claim 3, wherein
  the first installation portion (411) and the second installation portion (421) are one of a boot mouth (1600) and a female boot mouth (2600), and the third installation portion (321) is the other of the male boot mouth (1600) and the female boot mouth (2600);
  the female boot mouth (2600) comprises two side plates (2620) and a bottom plate (2640), one end of each of the two side plates (2620) is connected to the bottom plate (2640), and the other ends of the two side plates (2620) form an opening (2660);
a fixed slideway (2622) is provided in the two side plates (2620), and the two side plates (2620) and the bottom plate (2640) are combined to form a clamping slot (2623);
the male boot mouth (1600) is a plate (4006) that is matingly connected to the female boot mouth (2600), and notches (4007) are provided at both ends of a side of the plate (4006) that is fixedly connected to the clamping assembly (40); and
a side of the plate (4006) that is opposite to the clamping assembly (40) is connected to the fixed slideway (2622) of the two side plates of the female boot mouth (2600), and the male boot mouth (1600) and the female boot mouth (2600) are connected by the boot mouth connection.

6. The gimbal according to claim 2, wherein
a detection switch (322) is arranged on one side of the rotor end (32) away from the stator end (31);
the clamping base (41) is provided with a first detection portion (412) which comes into contact with the detection switch (322) when the first installation portion (411) and the third installation portion (321) are connected to each other;
the first ear clip (42) is provided with a second detection portion (422) which comes into contact with the detection switch (322) when the second installation portion (421) and the third installation portion (321) are connected to each other;
the gimbal further comprises a fill light assembly (50), and the fill light assembly (50) is detachably mounted on the clamping assembly (40); and
the fill light assembly (50) is provided with a snap-fit portion (51), and the first ear clip (42) or the second ear clip (43) is provided with a snap-fit groove (431) that matches the snap-fit portion (51); when the fill light assembly (50) is mounted on the clamping assembly (40), the snap-fit portion (51) is limited and snapped into the snap-fit groove (431).

7. The gimbal according to claim 2, wherein
both the first ear clip (42) and the second ear clip (43) are connected to the clamping base (41) through a pulling rod (4001);
the clamping base (41) is provided with a through hole (4002) for the pulling rod (4001) to pass through, and an end of the pulling rod (4001) is provided with an installation structure (4003); and
an end face of the installation structure (4003) is provided with a limiting opening (4004), a spring (4005) is sleeved on the pulling rod (4001), and the limiting opening (4004) limits the spring (4005).

8. The gimbal according to claim 2, wherein
the support assembly (20) comprises a rod body (21), one end of the rod body (21) is hinged with one end of the connection part (10) away from the clamping assembly (40) to form a connection hinge portion (2102); the rod body (21) is a multi-section rod body;
the support assembly (20) further comprises a leg base (22) and a support leg (24), and the other end of the rod body (21) is arranged on the leg base (22) in a penetrating way;
one end of the support leg (24) is hinged with the leg base (22), and the other end of the support leg (24) is unfolded or folded relative to the leg base (22);
a plurality of support legs (24) are evenly distributed around the outer periphery of the leg base (22);
the leg base (22) further comprises a rotation body (25) that is relatively rotatable around an axis of the rod body (21); and
the rotation body (25) is provided with a detachable control panel (26) that is electrically connected to the motor assembly (30) and generates control signals.

* * * * *